(12) United States Patent
Pant

(10) Patent No.: US 10,965,229 B2
(45) Date of Patent: Mar. 30, 2021

(54) AC POWER ADAPTER HAVING A SWITCHABLE CAPACITOR

(71) Applicant: Black & Decker Inc., New Britain, CT (US)

(72) Inventor: Pradeep M. Pant, Cockeysville, MD (US)

(73) Assignee: Black & Decker Inc., New Britain, CT (US)

(*) Notice: Subject to any disclaimer, the term of this patent is extended or adjusted under 35 U.S.C. 154(b) by 0 days.

(21) Appl. No.: 16/591,938

(22) Filed: Oct. 3, 2019

(65) Prior Publication Data

US 2020/0036308 A1    Jan. 30, 2020

Related U.S. Application Data

(63) Continuation of application No. 16/033,659, filed on Jul. 12, 2018, now Pat. No. 10,469,006, which is a
(Continued)

(51) Int. Cl.

| | |
|---|---|
| *H02P 6/28* | (2016.01) |
| *H02K 7/14* | (2006.01) |
| *H02M 7/219* | (2006.01) |
| *H02M 7/12* | (2006.01) |
| *H01M 2/10* | (2006.01) |

(Continued)

(52) U.S. Cl.
CPC ............ *H02P 6/28* (2016.02); *H01M 2/1022* (2013.01); *H02J 7/0024* (2013.01); *H02J 7/0045* (2013.01); *H02J 7/02* (2013.01); *H02J 7/022* (2013.01); *H02J 7/045* (2013.01); *H02K 7/145* (2013.01); *H02M 7/125* (2013.01); *H02M 7/219* (2013.01); *H02P 6/085* (2013.01); *H02P 23/26* (2016.02); *H02P 25/14* (2013.01); *H02P 27/08* (2013.01); *H02P 29/024* (2013.01); *H02P 29/0241* (2016.02); *H02P 29/032* (2016.02); *H01M 2220/30* (2013.01); *H02J 2207/20* (2020.01)

(58) Field of Classification Search
None
See application file for complete search history.

(56) References Cited

U.S. PATENT DOCUMENTS

| | | | | |
|---|---|---|---|---|
| 4,589,808 A | * | 5/1986 | O'Connor ............ | B23B 31/265 408/239 A |
| 2007/0090796 A1 | * | 4/2007 | Norris .................. | H02J 7/0045 320/114 |

(Continued)

*Primary Examiner* — Bentsu Ro
(74) *Attorney, Agent, or Firm* — Amir Rohani

(57) ABSTRACT

A power adapter is provided to supply electric power from an alternating current from an alternating current (AC) power supply to a powered apparatus. It includes a switchable capacitor circuit housed within a housing and including a switchable capacitor switchably coupled across the AC power supply and a H-bridge circuit including four switches. An OFF-state of the four switches creates a charging path for the switchable capacitor, an ON-state of a first pair of the four switches creates a discharge path for the switchable capacitor during a positive half cycle of the alternating current, and an ON-state of a second pair of the four switches creates a discharge path for the switchable capacitor during a negative half cycle of the alternating current.

17 Claims, 20 Drawing Sheets

Related U.S. Application Data continuation of application No. 15/623,541, filed on Jun. 15, 2017, now Pat. No. 10,050,572, which is a continuation of application No. PCT/US2015/066826, filed on Dec. 18, 2015, which is a continuation-in-part of application No. 14/715,258, filed on May 18, 2015, now Pat. No. 9,406,915.

(60) Provisional application No. 62/094,156, filed on Dec. 19, 2014.

(51) Int. Cl.
*H02J 7/00* (2006.01)
*H02J 7/02* (2016.01)
*H02J 7/04* (2006.01)
*H02P 23/26* (2016.01)
*H02P 6/08* (2016.01)
*H02P 29/024* (2016.01)
*H02P 29/032* (2016.01)
*H02P 25/14* (2006.01)
*H02P 27/08* (2006.01)

(56) References Cited

U.S. PATENT DOCUMENTS

| | | | |
|---|---|---|---|
| 2013/0207590 A1* | 8/2013 | Yanagihara | H02P 23/00 318/807 |
| 2015/0042280 A1* | 2/2015 | Rief | H01M 2/1022 320/113 |
| 2018/0323734 A1* | 11/2018 | Pant | H02J 7/022 |
| 2020/0162011 A1* | 5/2020 | Cox | H02J 7/022 |

\* cited by examiner

AC POWER ADAPTER HAVING A SWITCHABLE CAPACITOR

CROSS-REFERENCE TO RELATED APPLICATIONS

This application is a continuation of U.S. patent application Ser. No. 16/033,659 filed Jul. 12, 2018, which is a continuation of U.S. patent application Ser. No. 15/623,541 filed Jun. 15, 2017, now U.S. Pat. No. 10,050,572, which is a continuation of PCT Application No. PCT/US2015/066826 filed Dec. 18, 2015, which is a continuation-in-part of U.S. patent application Ser. No. 14/715,258 filed May 18, 2015, and also claims the benefit of U.S. Provisional Application No. 62/094,156, filed on Dec. 19, 2014. The entire disclosures of the above applications are incorporated herein by reference.

FIELD

The present disclosure relates to a power tool having an electric motor.

BACKGROUND

Some power tools include brushless electric motors. Power tools with brushless electric motors use a rectifier to convert an alternating current (AC) input into a direct current (DC) that is used to drive the brushless electric motor. Power tools with brushless electric motors also employ a capacitor to lessen ripple and to provide a current when the AC input voltage is unable to do so.

During certain operating conditions, such as a high load, high voltage transients may be generated in a DC power bus that transmits direct current to the electric motor. The high voltage spikes can damage electronic components within the power tool. Accordingly, there is a need for a power tool that mitigates high voltage spikes without effecting normal operation of the power tool.

This section provides background information related to the present disclosure, which is not necessarily prior art.

SUMMARY

This section provides a general summary of the disclosure, and is not a comprehensive disclosure of its full scope or all of its features.

In an aspect of the present disclosure, the present disclosure may be directed toward a power tool configured to receive power from a power supply. The power tool may comprise: an electric motor, a rectifier, a switching arrangement, a switch path, and a switch control circuit. The rectifier may be configured to receive an alternating current from an alternating current (AC) power supply and output a rectified signal supplied to a DC power bus. The switching arrangement may have a plurality of motor switches connected electrically between the DC power bus and the electric motor, and may operate to deliver electric power from the DC power bus to the electric motor. The switch path may be electrically coupled in parallel with the rectifier on the DC power bus. The switch path may include an auxiliary capacitor in series with a switch and a state of the switch may control a discharging path for the auxiliary capacitor. The switch control circuit may be configured to detect voltage associated with at least one of the AC power supply or the DC power bus and to control state of the switch in accordance with magnitude of the detected voltage.

In an aspect of the present disclosure, the switch control circuit may include a sensing circuit and a comparator. The sensing circuit may be configured to detect the voltage across the DC power bus, and the comparator may be configured to compare the voltage detected with a predetermined threshold and output a signal to the switch to control the state of the switch.

In another aspect of the present disclosure, the sensing circuit may include a voltage divider that is electrically coupled to the DC power bus and the comparator. The comparator may include a transistor and a diode. The diode may be coupled between the DC power bus and the emitter of the transistor, the base of the transistor may be coupled to the voltage divider, and the collector of the transistor may be coupled to the switch to control the state of the switch.

In yet another aspect of the present disclosure, the power tool may further comprise a DC bus capacitor. The DC bus capacitor may be electrically coupled in parallel with the rectifier and electrically connected between the rectifier and the switching arrangement. The capacitance of the DC bus capacitor may be less than capacitance of the auxiliary capacitor.

In an aspect of the present disclosure, the DC bus capacitor may have a capacitance of about 5 µF to 20 µF.

In another aspect of the present disclosure, the switch control circuit may open the switch to prevent current flow through the discharge path when the detected voltage is less than or equal to a first voltage threshold and close the switch to allow current flow through the discharge path when the detected voltage is greater than a second voltage threshold greater than the first voltage threshold.

In yet another aspect of the present disclosure, the electric motor may be a brushless motor.

In an aspect of the present disclosure, the switch control circuit may be coupled to at least one node of the DC power bus.

In another aspect of the present disclosure, the switch control circuit may include a sensing circuit and a comparator. The sensing circuit may detect voltage across the auxiliary capacitor, and the comparator may be configured to compare the voltage detected with a predetermined threshold and output a signal to the switch to control the state of the switch.

In yet another aspect of the present disclosure, the power tool may further comprise a first housing and a second housing. The first housing may house the electric motor and the switching arrangement, and the second housing separate from the first housing may house the switch path and the switch control circuit. The second housing may be configured to connect to the first housing to electrically couple the switch path in parallel with the DC power bus.

In an aspect of the present disclosure, the present disclosure may be directed toward a power tool configured to receive power from a power supply. The power tool may comprise: an electric motor, a power bus, a switching arrangement, a DC bus capacitor, an auxiliary switch path, and a switch control circuit. The power bus may include positive and negative lines. The switching arrangement may have a plurality of motor switches and may be operable to deliver electric power from the power bus to the electric motor. The DC bus capacitor may be electrically coupled across the power bus. The auxiliary switch path may be electrically coupled in parallel with the DC bus capacitor. The auxiliary switch path includes an auxiliary capacitor in series with a switch. The capacitance of the DC bus capacitor may be less than capacitance of the auxiliary capacitor. The switch forms a first current passageway through the auxiliary capacitor to charge the auxiliary capacitor when in a first state and forms a second current passageway through the auxiliary capacitor to discharge the auxiliary capacitor when in a second state. The switch control circuit may be configured to detect voltage of the power bus and to control state of the switch in accordance with magnitude of the detected voltage.

In an aspect of the present disclosure, the switch may include a transistor and a switch control circuit that may be configured to activate and deactivate the transistor based on the detected voltage.

In another aspect of the present disclosure, in the first state, the transistor may electrically decouple the auxiliary capacitor from the power bus to have current flow through the auxiliary capacitor via the first current passageway, and in the second state, the transistor may electrically couple the auxiliary capacitor to the power bus to have current flow through the auxiliary capacitor via the first current passageway and the second current passageway.

In yet another aspect of the present disclosure, the switch control circuit may include a sensing circuit and a comparator. The sensing circuit may be configured to detect the voltage across at least one of the power bus and the auxiliary capacitor, and the comparator may compare the voltage detected with a predetermined threshold and output a signal to the switch to control the state of the switch.

In an aspect of the present disclosure, the switch control circuit may control the switch in the first state when the detected voltage is less than or equal to a first voltage threshold and control the switch in the second state when the detected voltage is greater than a second voltage threshold greater than the first voltage threshold.

In another aspect of the present disclosure, the DC bus capacitor may have a capacitance of about 10 µF to 20 µF.

In yet another aspect of the present disclosure, the power tool may further comprise a housing, a power supply interface, and an AC power adapter. The housing may house the electric motor, the switching arrangement, and the DC bus capacitor. The power supply interface may be positioned along a surface of the housing. The AC power adapter may be configured to attach to the power supply interface and may include an auxiliary capacitor circuit. The auxiliary capacitor circuit may include the auxiliary switch path and the switch control circuit. The auxiliary switch path may be electrically coupled to the power bus when the AC power adapter is attached to the power supply interface and may be electrically decoupled from the power bus when the AC power adapter is detached from the power supply interface.

In an aspect of the present disclosure, the present disclosure may be directed toward a power tool configured to receive power from a power supply. The power tool may comprise: a brushless electric motor; a rectifier, a switching arrangement, an auxiliary switch path, a DC bus capacitor, and a switch control circuit. The rectifier may be configured to receive an alternating current from an alternating current (AC) power supply and may be operable to convert the alternating current to a rectified current supplied to a DC bus. The switching arrangement may have a plurality of motor switches connected electrically between the rectifier and the brushless the electric motor, and may operate to deliver the rectified current from the rectifier to the electric motor. The auxiliary switch path may be electrically coupled across the DC bus in parallel with the rectifier. The auxiliary switch path may include an auxiliary capacitor in series with a transistor. The DC bus capacitor may be electrically coupled in parallel with the rectifier. The capacitance of the DC bus capacitor may be less than capacitance of the auxiliary capacitor. The switch control circuit may be configured to detect voltage associated with the power supply or the DC bus and to control state of auxiliary capacitor by way the transistor in accordance with magnitude of the detected voltage. The switch control circuit may control the transistor in an OFF state to charge the auxiliary capacitor when the detected voltage is less than or equal to a first voltage threshold and control the transistor in an ON state to discharge the auxiliary capacitor when the detected voltage is greater than a second voltage threshold greater than the first voltage threshold.

In an aspect of the present disclosure, the transistor is an IGBT with an anti-parallel diode.

In another aspect of the present disclosure, the auxiliary capacitor discharges to the DC bus when the transistor is in the ON state.

In an aspect of the present disclosure, the present disclosure may be directed toward a power adapter for use with a power tool and configured to supply electric power from an alternating current power supply to the power tool. The power tool may include an electric motor. The power adapter may comprise: a housing and an auxiliary capacitor circuit. The auxiliary capacitor circuit may be housed within the housing and may include an auxiliary capacitor, a switch in series with the auxiliary capacitor, and a switch control circuit. A state of the switch may create either a charging path for the auxiliary capacitor or both the charging path and a discharging path for the auxiliary capacitor. The switch control circuit may be configured to detect voltage associated with the power supply or the power tool and to control state of the switch in accordance with magnitude of the detected voltage.

In an aspect of the present disclosure, the switch control circuit may include a sensing circuit and a comparator. The sensing circuit may be configured to detect the voltage across at least one of a DC bus provided in the power tool and the auxiliary capacitor. The comparator may compare the voltage detected with a predetermined threshold and output a signal to the switch to control the state of the switch.

In another aspect of the present disclosure, the sensing circuit may include a voltage divider that is electrically coupled to the comparator and may be configured to electrically couple to the DC bus. The comparator may include a transistor and a diode. The diode may be configured to electrical couple between the DC bus and the emitter of the transistor, the base of the transistor may be coupled to the voltage divider, and the collector of the transistor may be coupled to the switch to control the state of the switch.

In yet another aspect of the present disclosure, the power adapter may further comprise one or more terminals that may be electrically coupled to the auxiliary capacitor circuit and configured to connect to an interface provided on the power tool. With the terminals connected to the interface of the power tool, the auxiliary capacitor and the switch form an auxiliary switch path that may be electrically coupled across a DC bus of the power tool, and the switch control circuit may be electrically coupled to the DC bus for detecting the voltage along the DC bus.

In an aspect of the present disclosure, the power adapter may further comprise a rectifier and a DC bus capacitor. The rectifier may be configured to receive an alternating current from the alternating current power supply and may be operable to convert the alternating current to a rectified current supplied to a DC bus. The DC bus capacitor may be electrically coupled in parallel with the rectifier, and the capacitance of the DC bus capacitor may be less than capacitance of the auxiliary capacitor.

Further areas of applicability will become apparent from the description provided herein. The description and specific examples in this summary are intended for purposes of illustration only, and are not intended to limit the scope of the present disclosure.

DRAWINGS

The drawings described herein are for illustrative purposes only of selected embodiments and not all possible implementations, and are not intended to limit the scope of the present disclosure.

Figure 2:
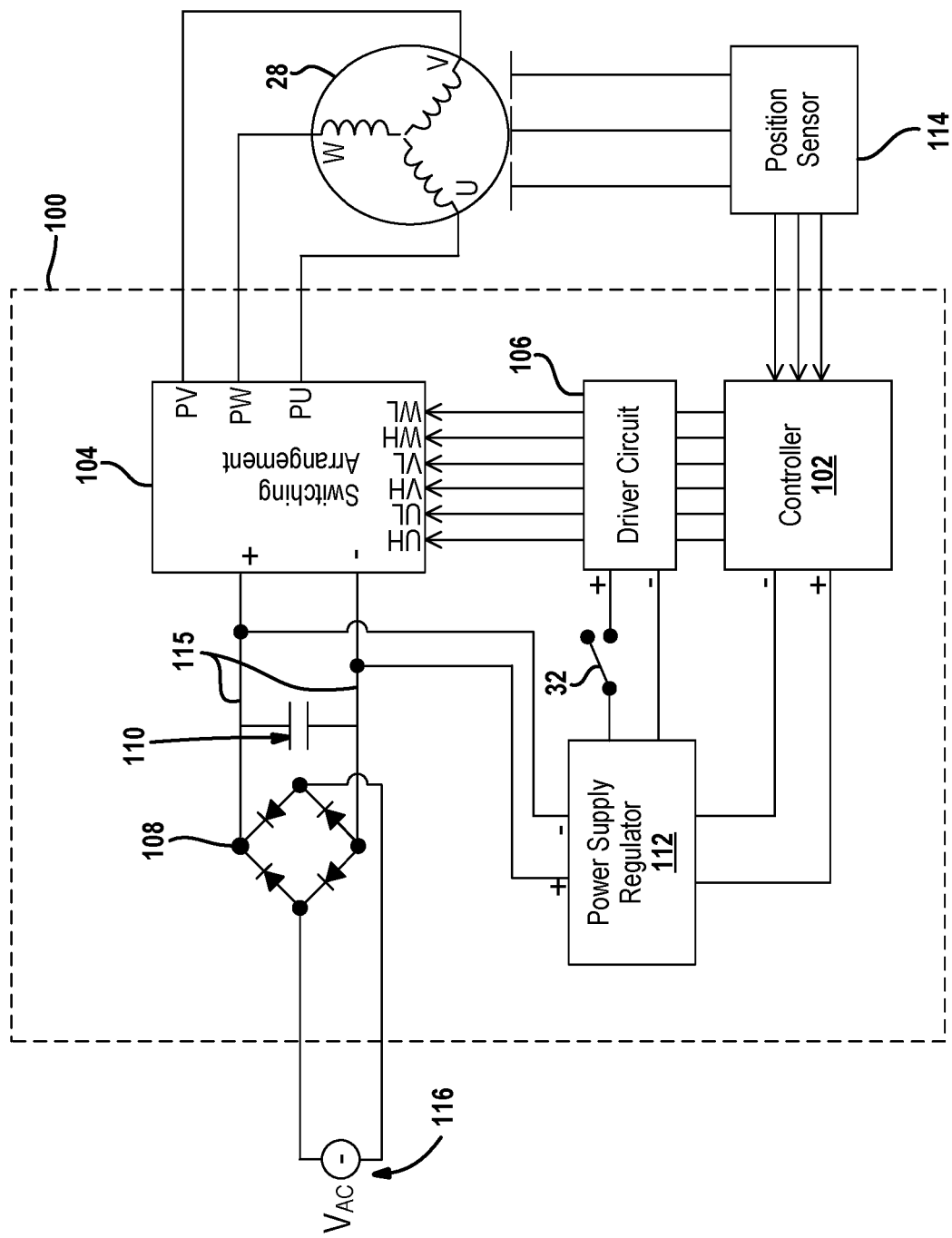
FIG. 2 is an example motor control system which may be employed by the power tool.
Figure 3A:
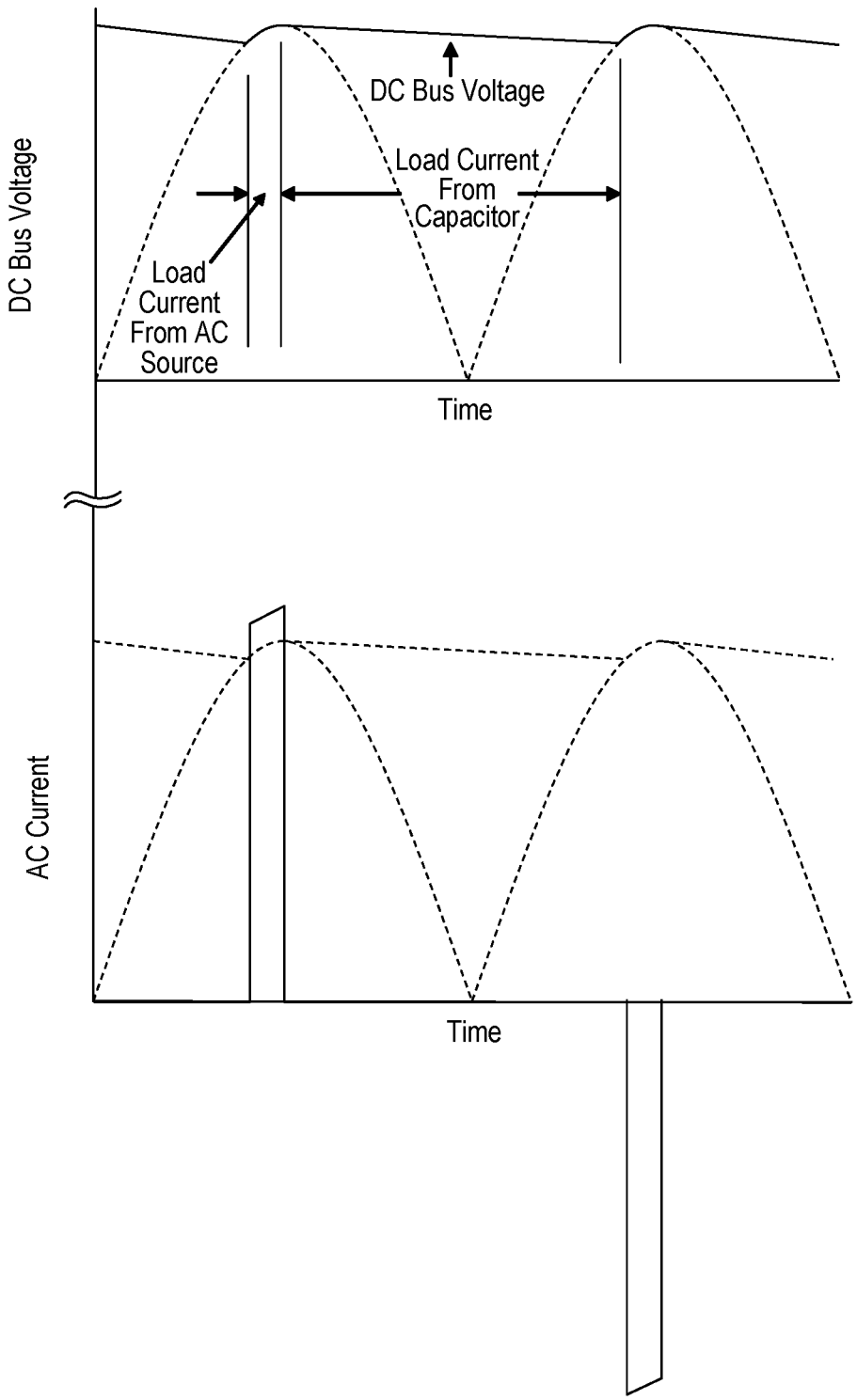
Figure 3B:
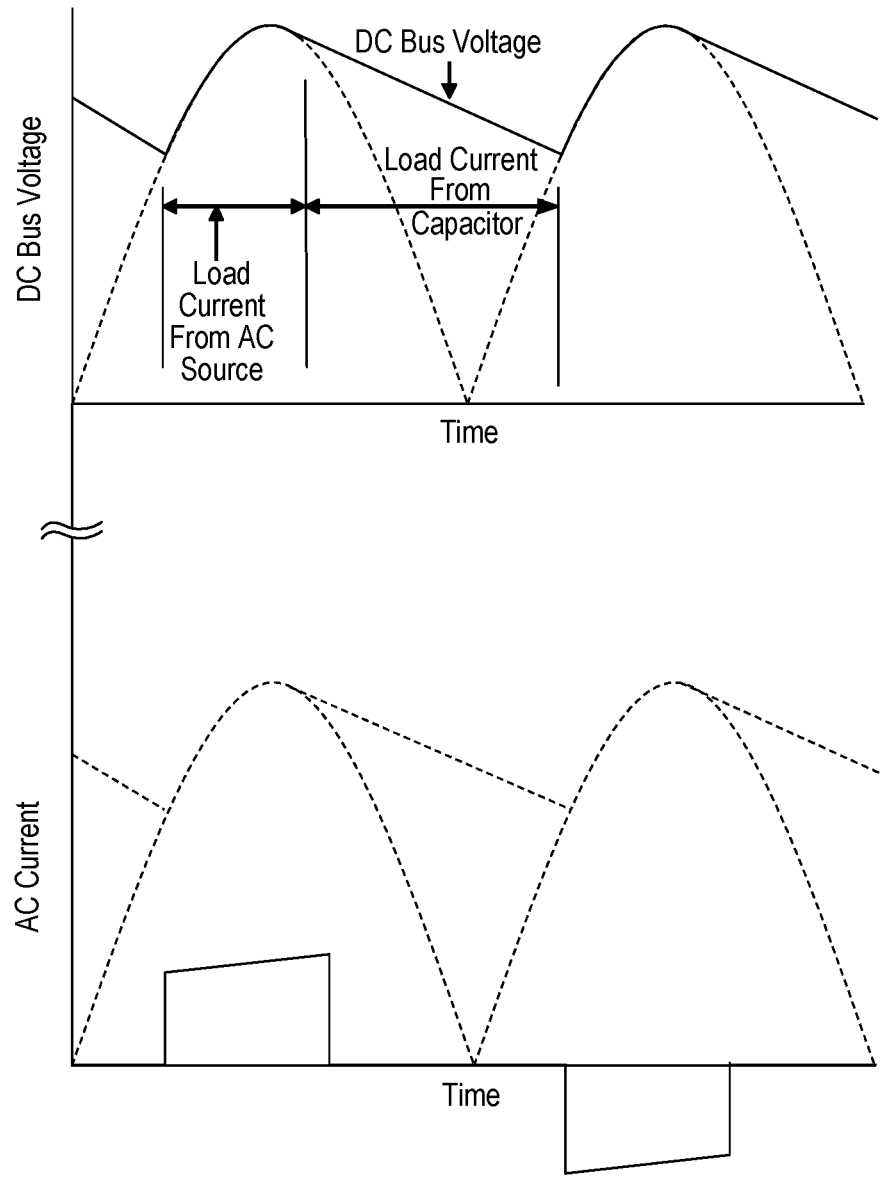
Figure 3C:
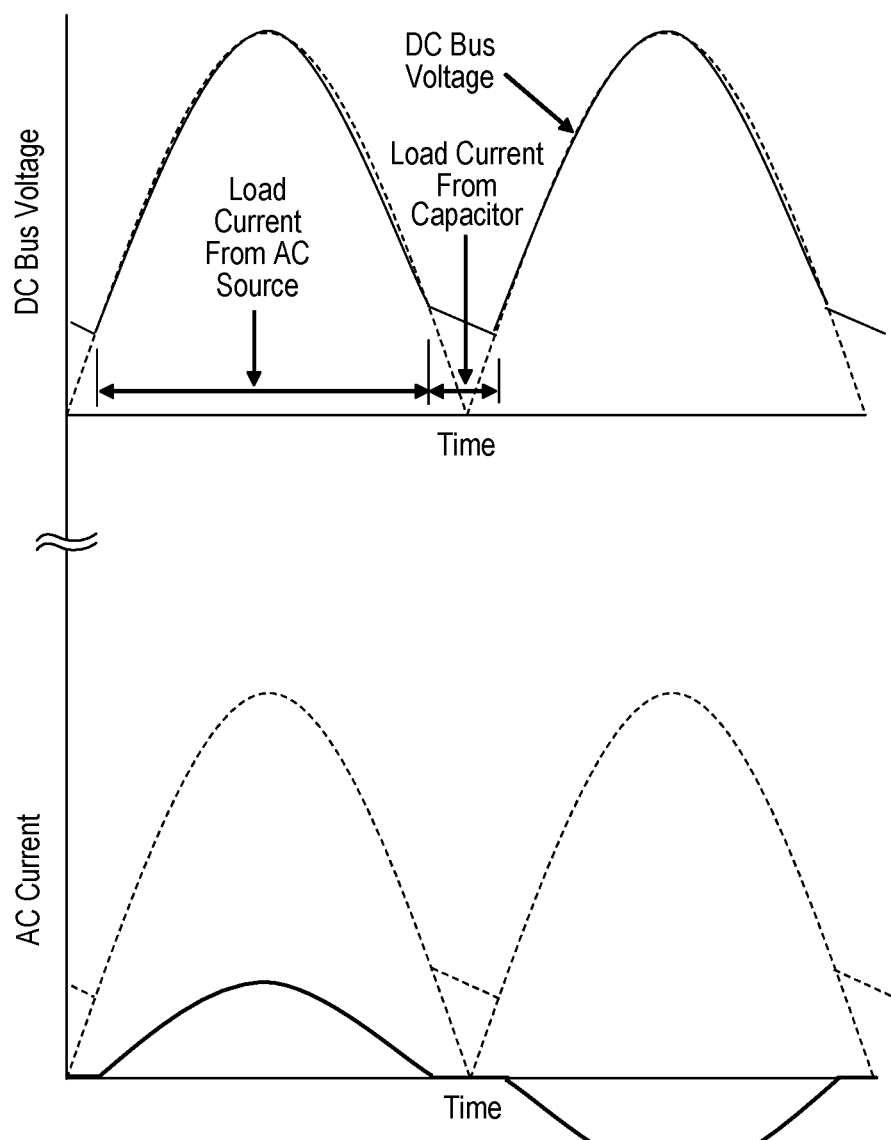
Figure 4:
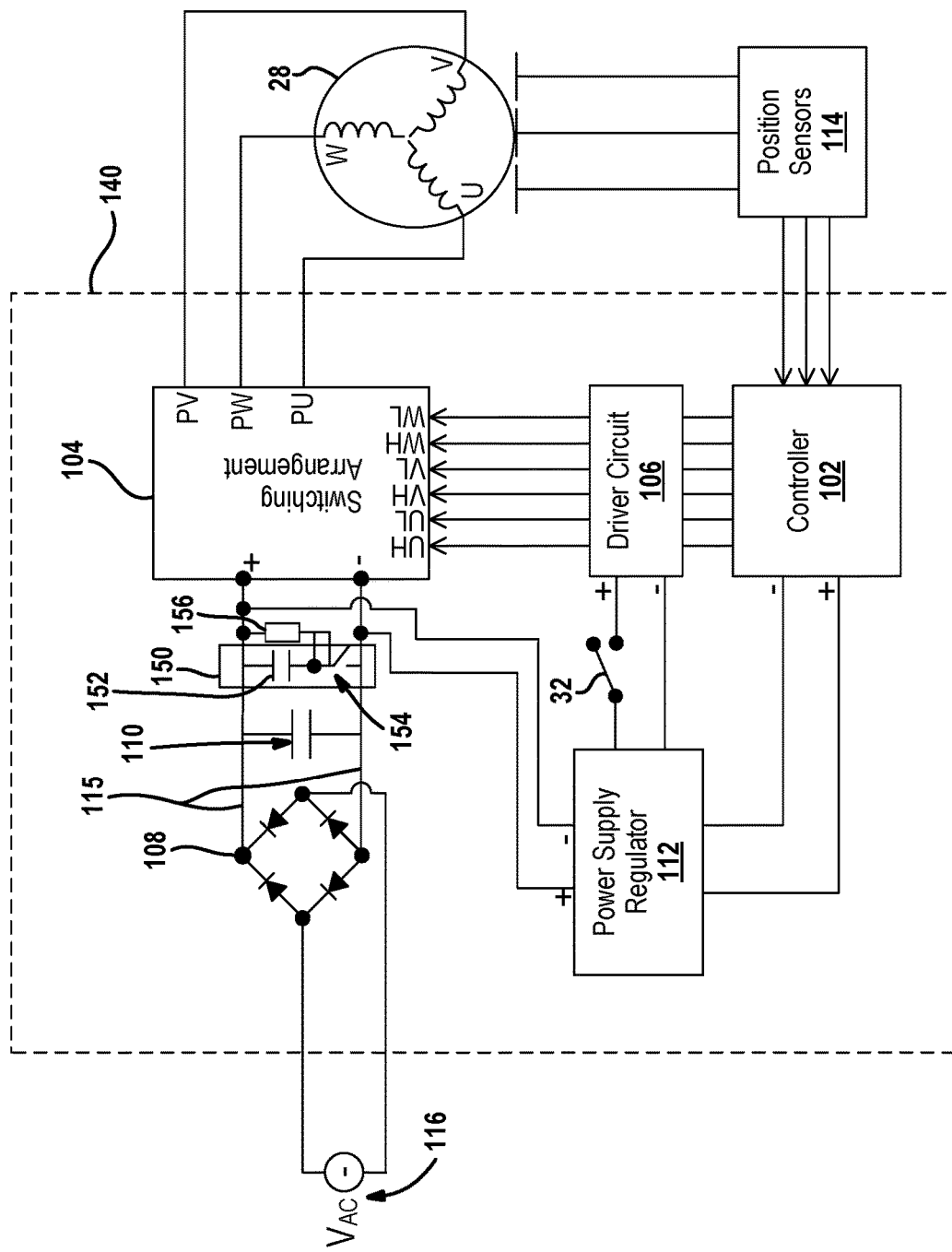
Figure 5:
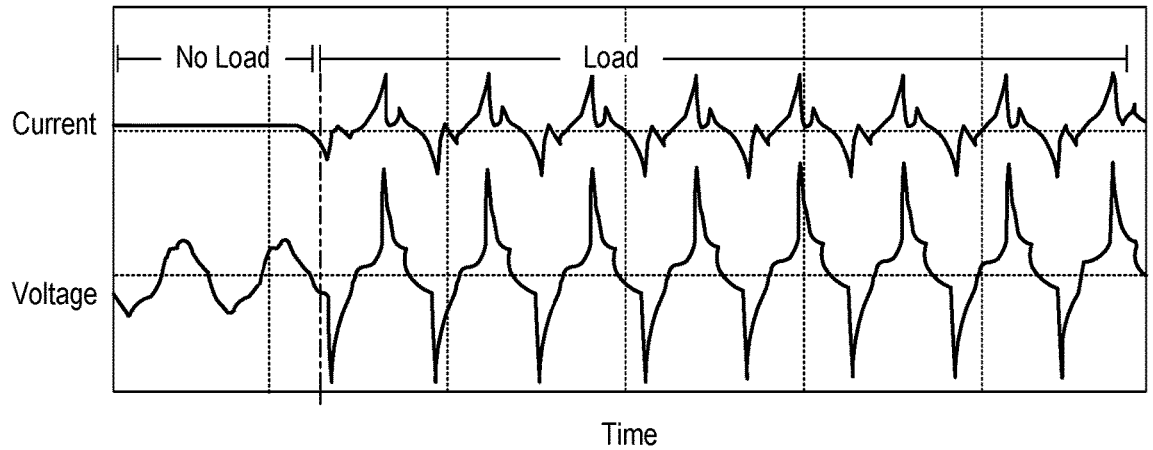
Figure 6:
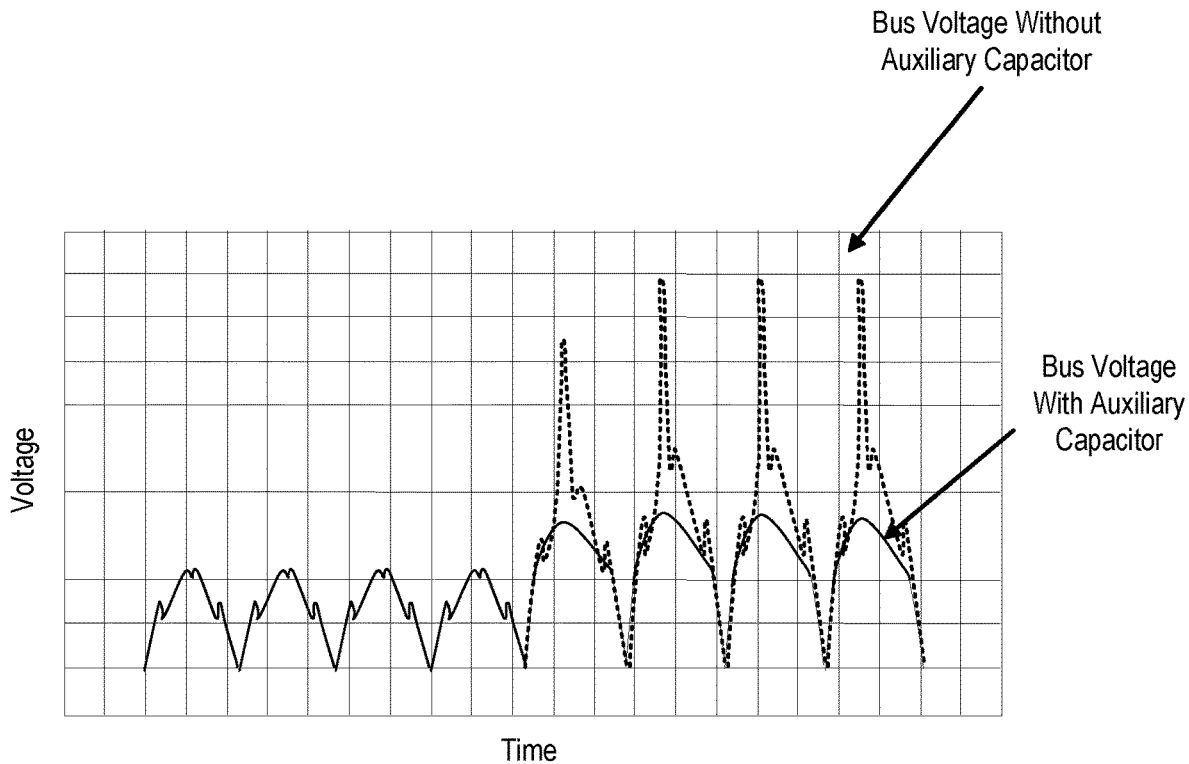
Figure 7:
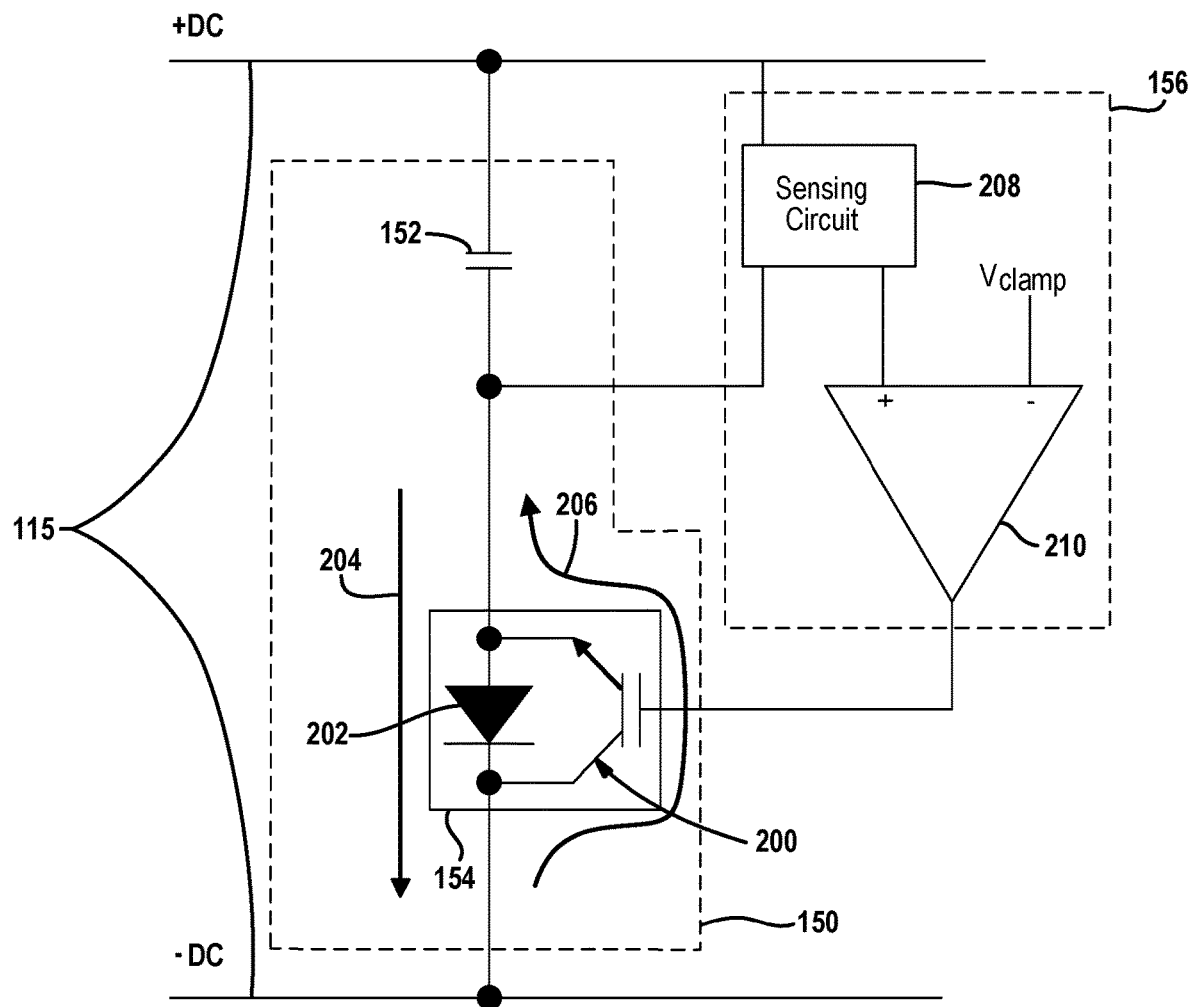
Figure 8:
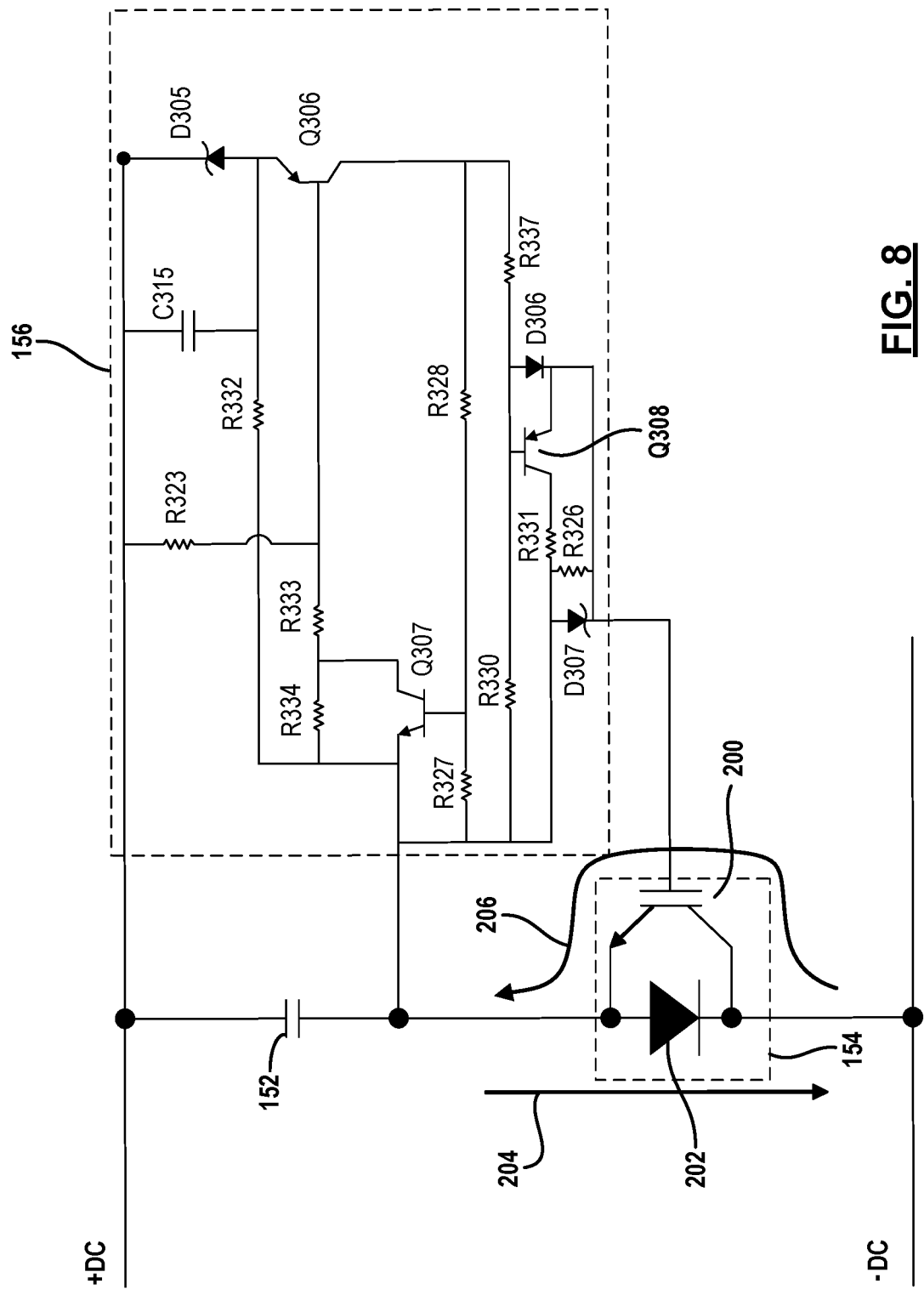
Figure 9:
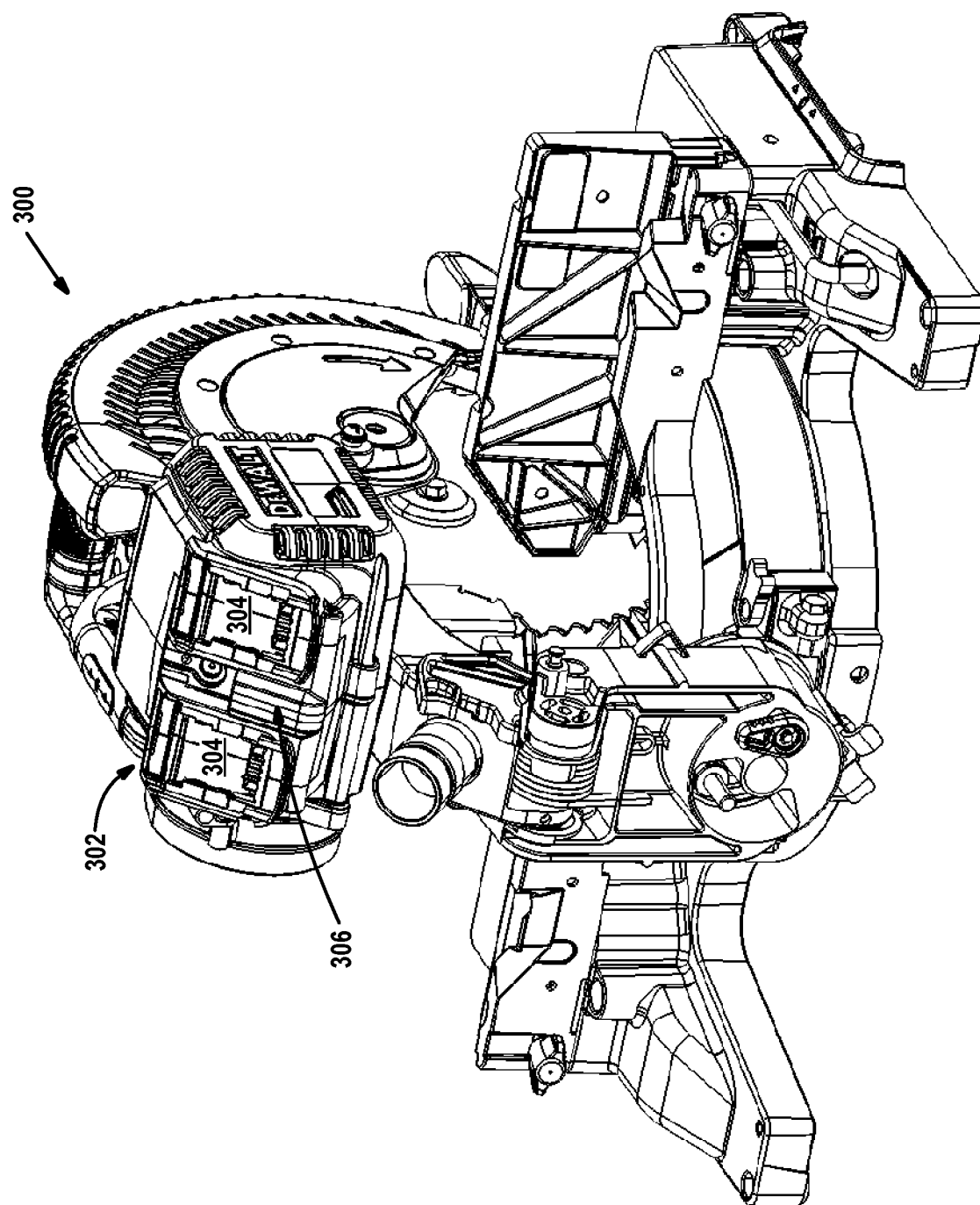
Figure 10:
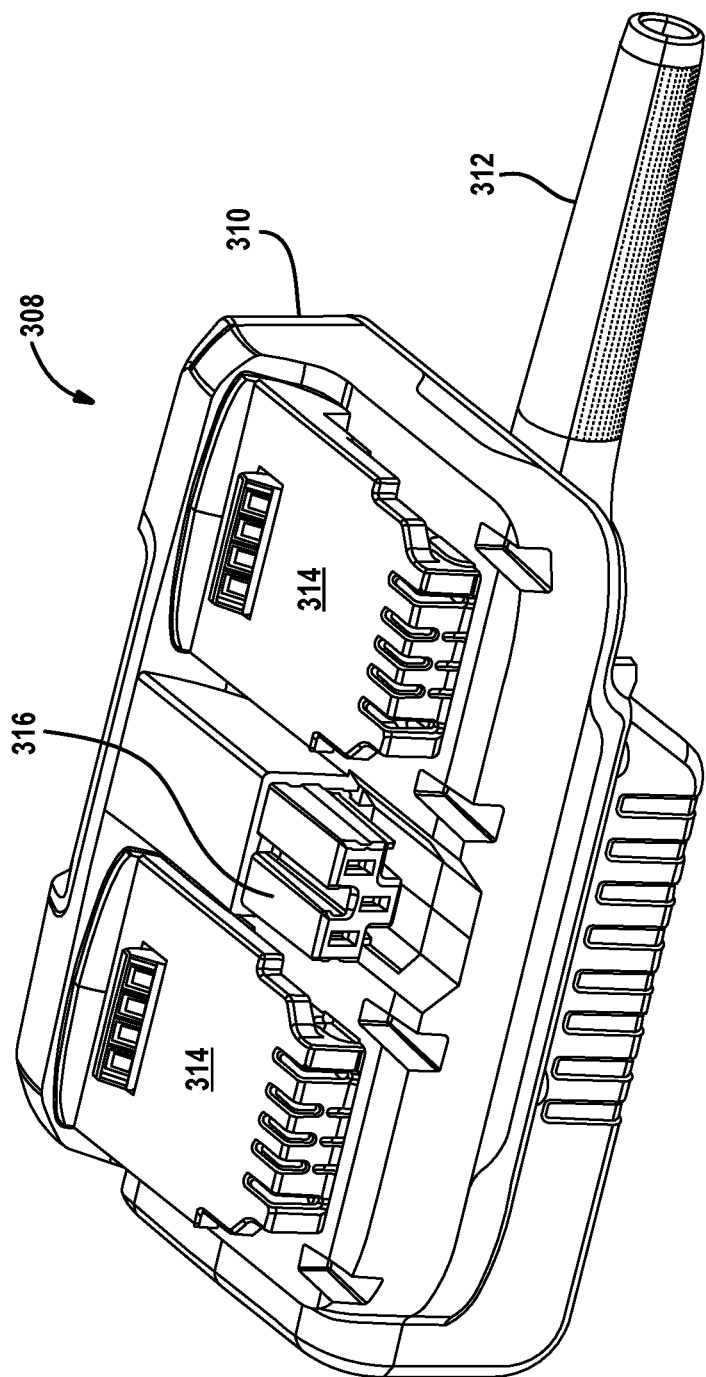
Figure 11:
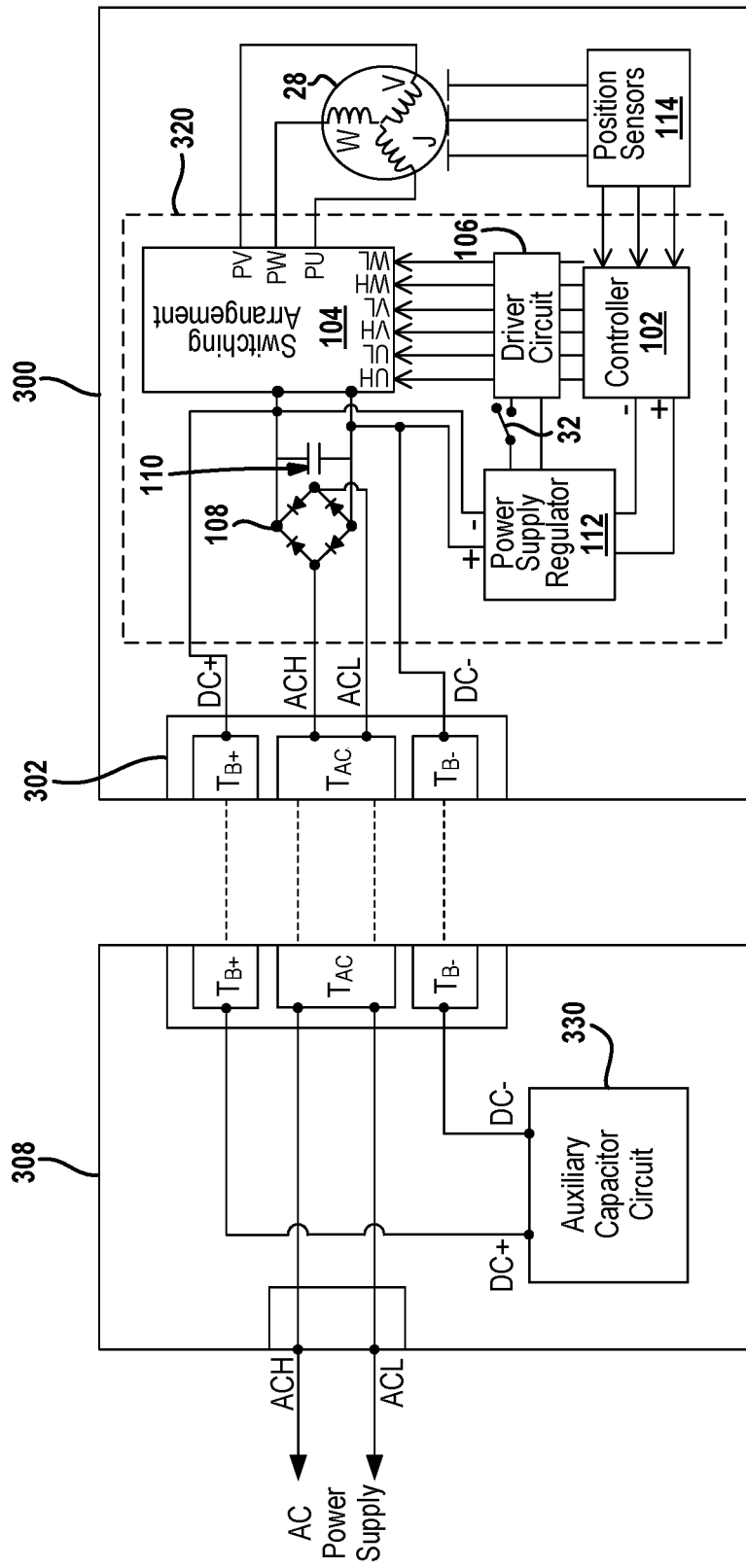
Figure 12:
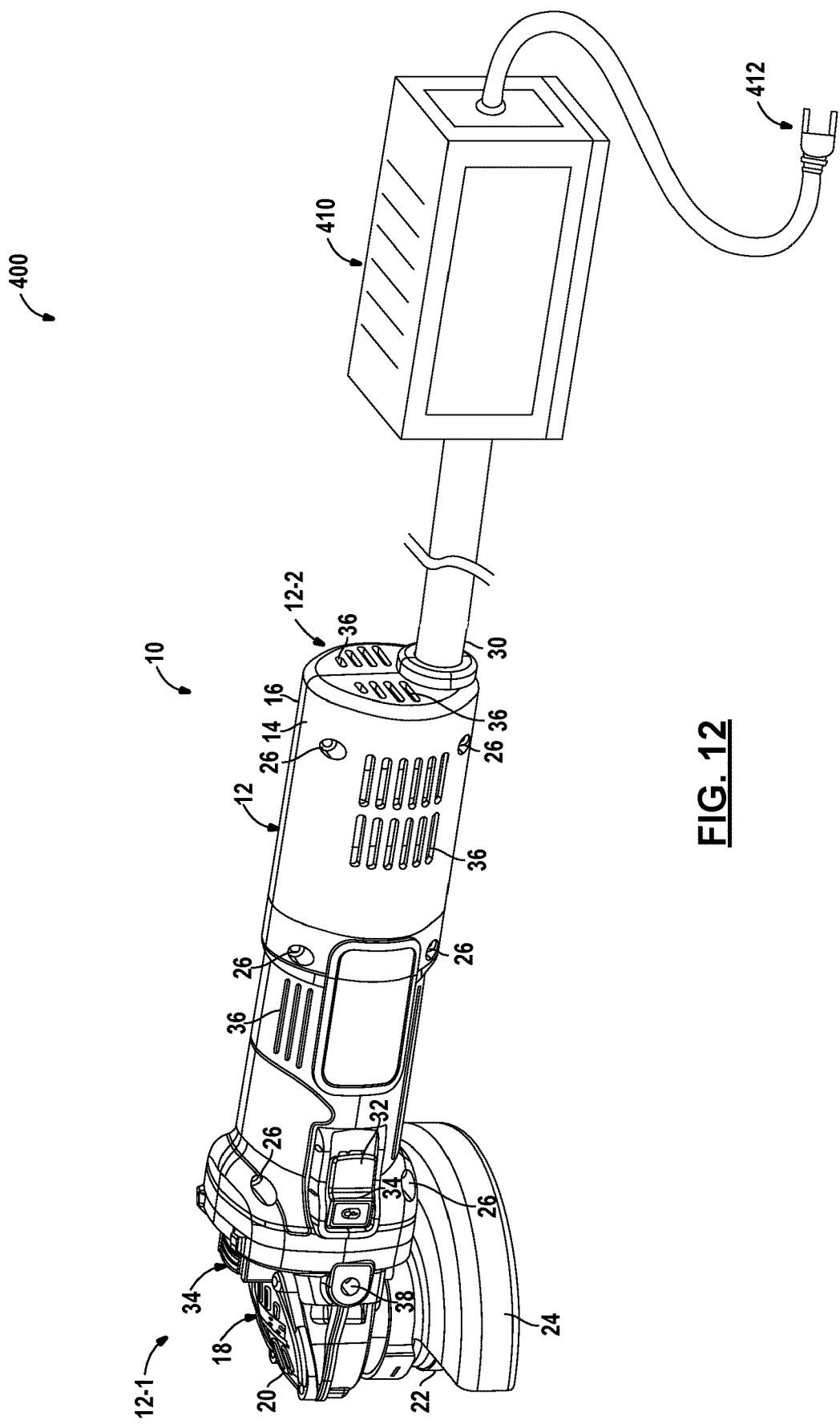
Figure 13:
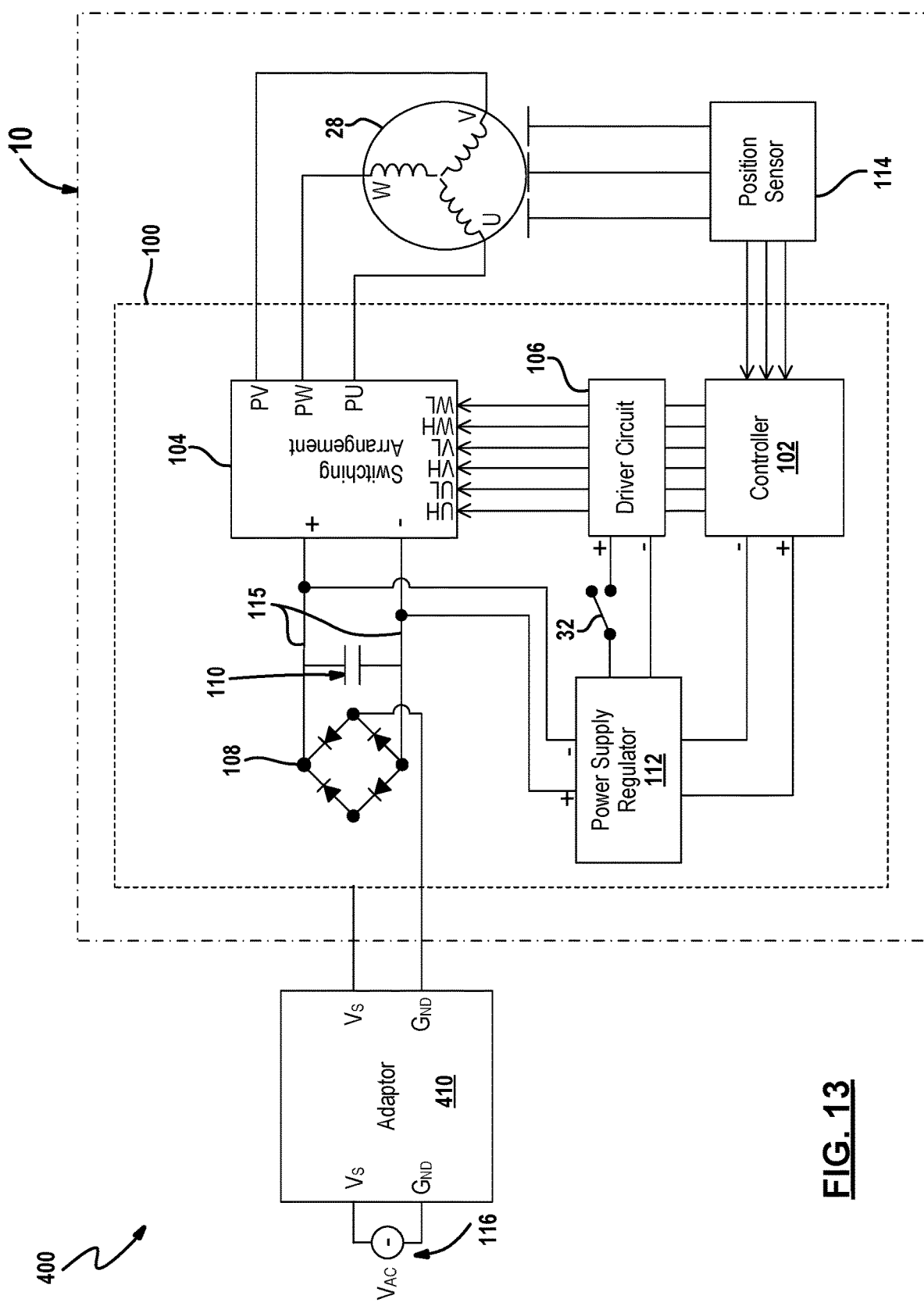
Figure 14:
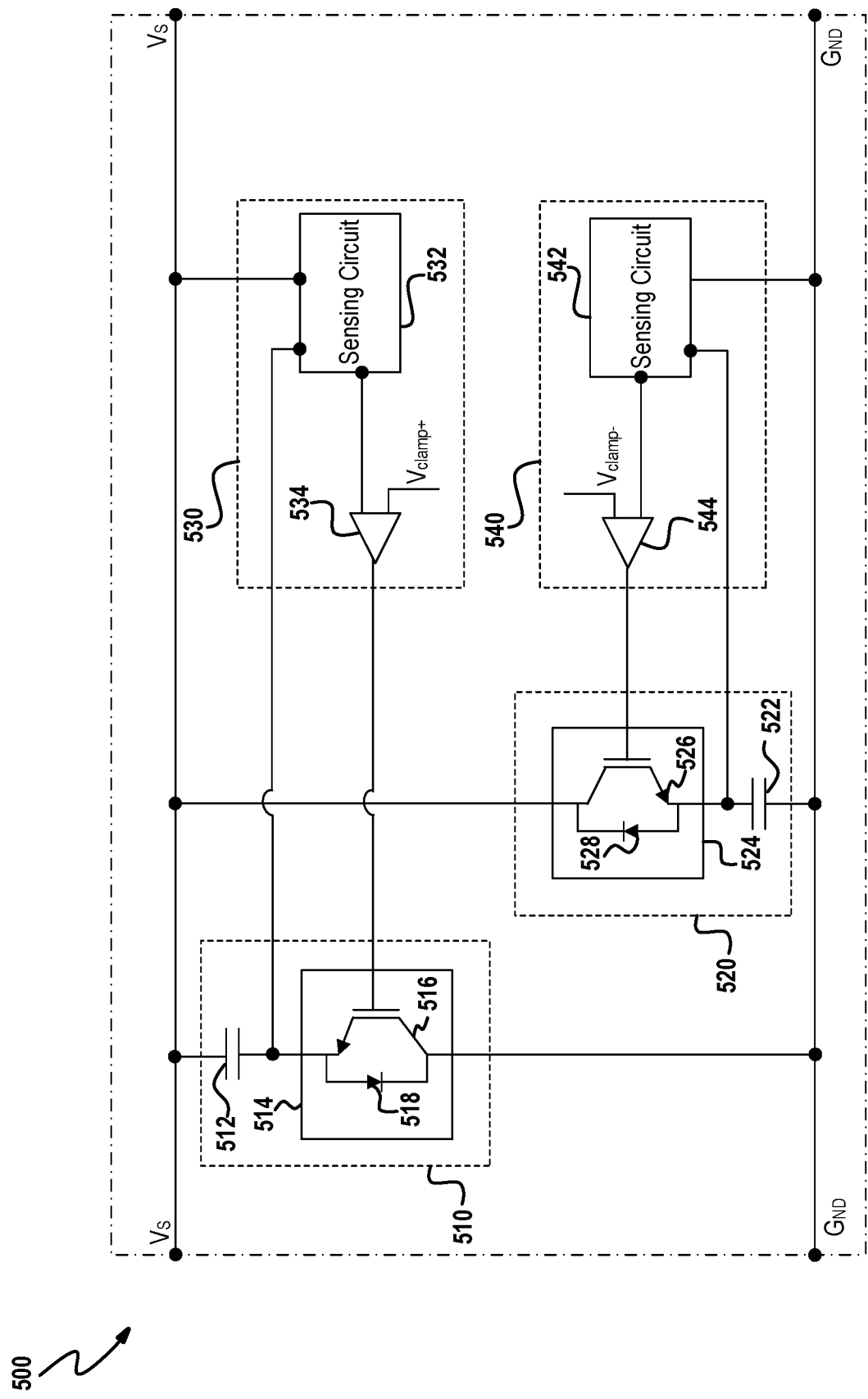
Figure 15:
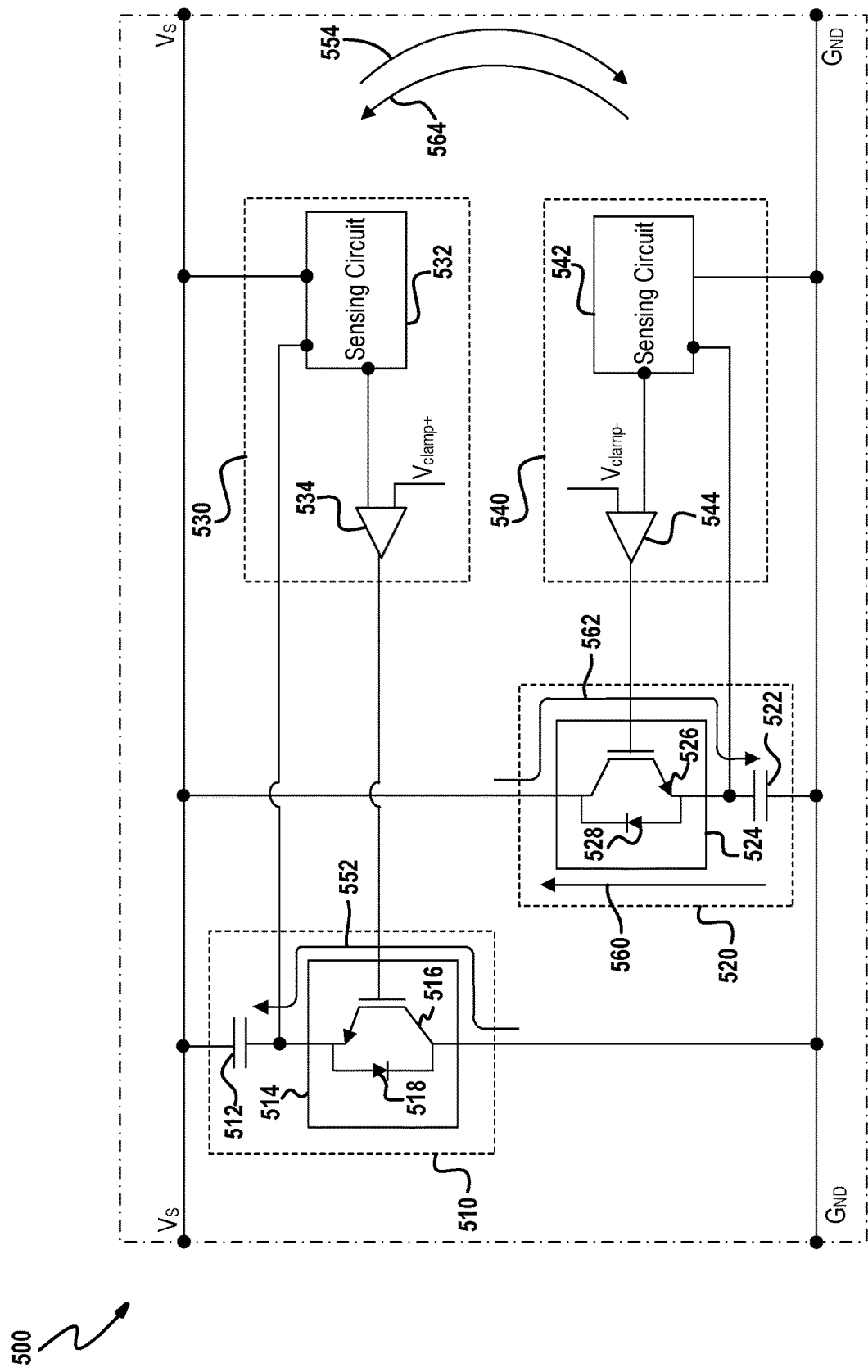
Figure 16:
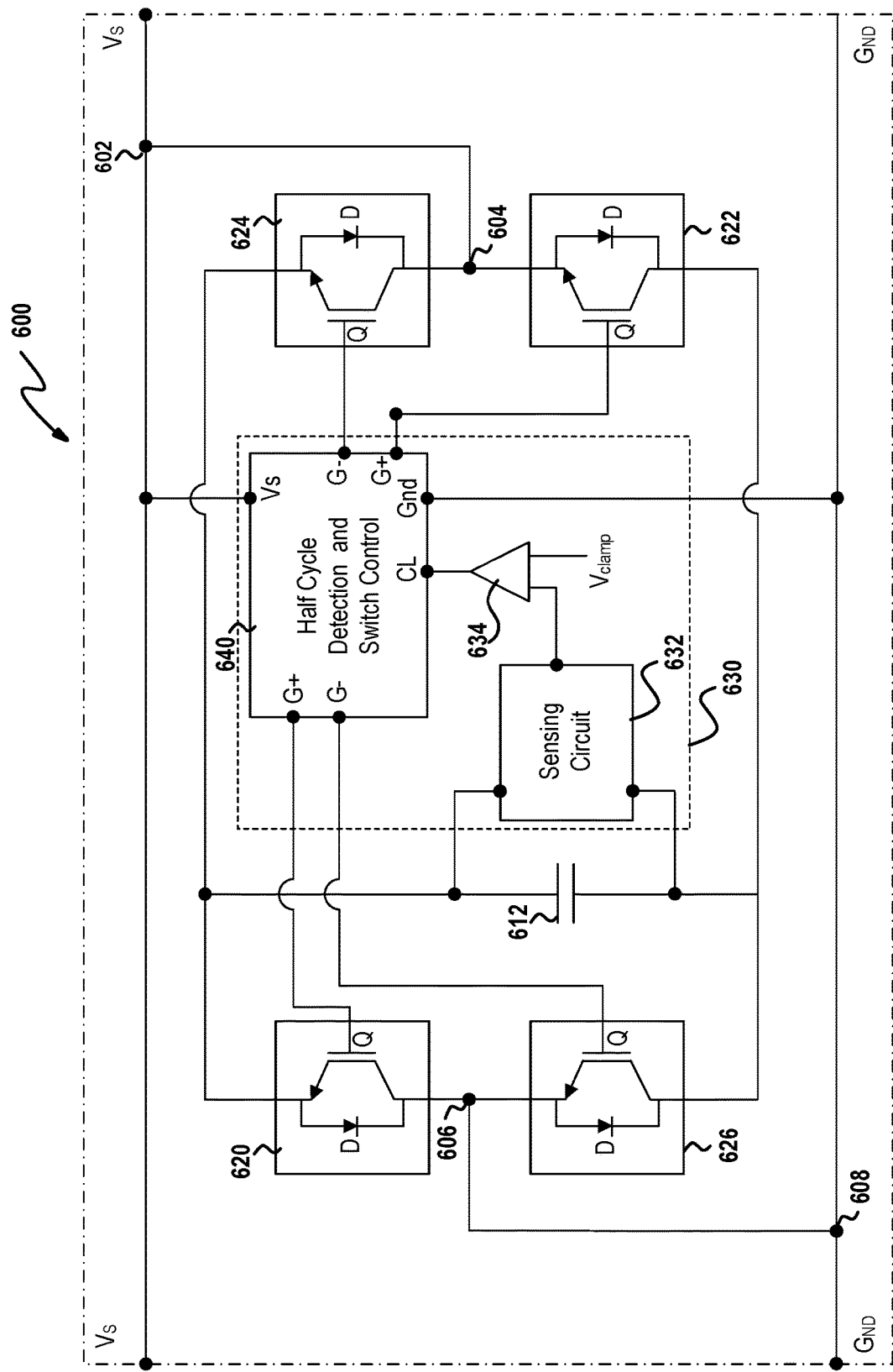
Figure 17:
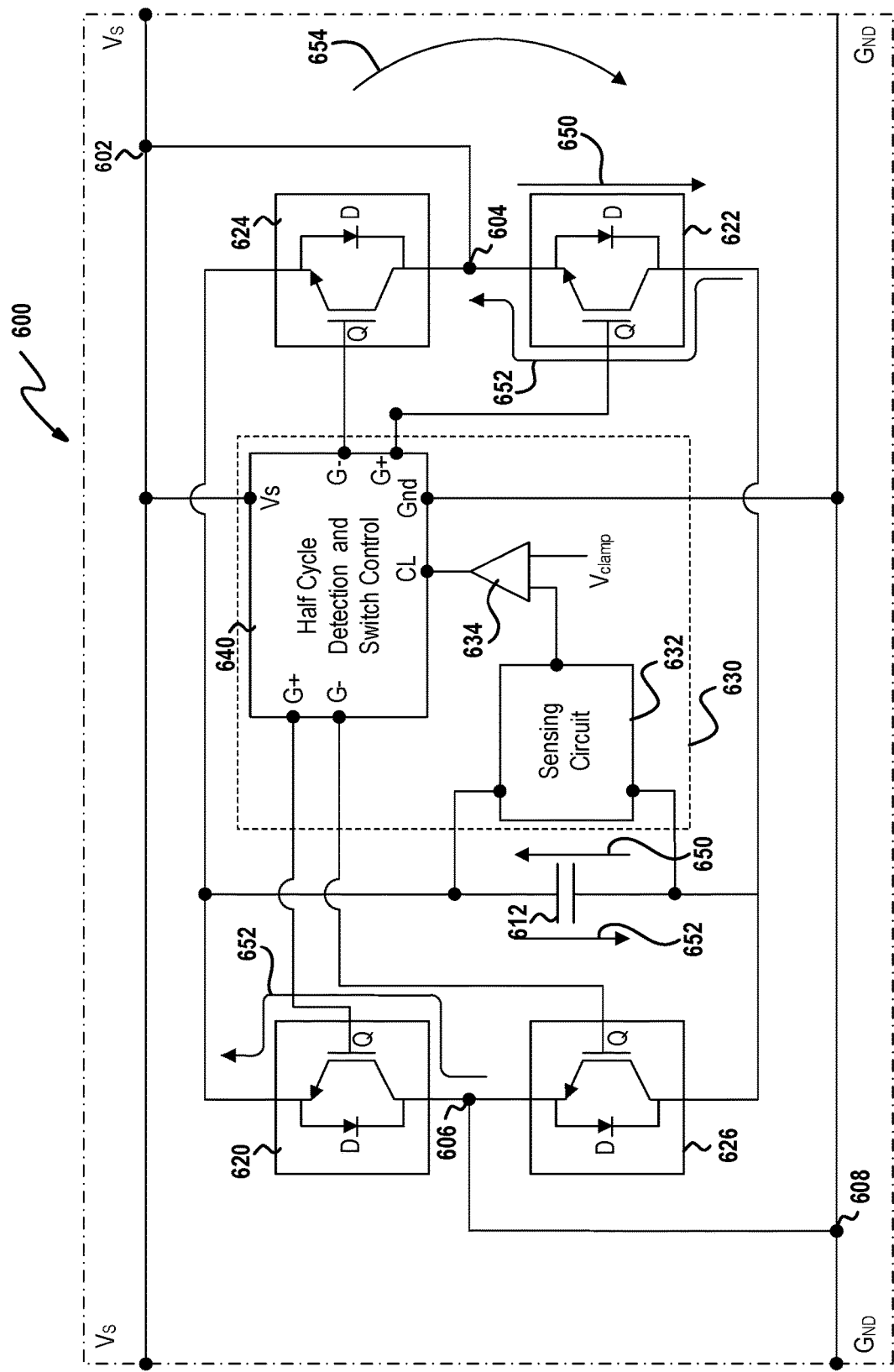
Figure 18:
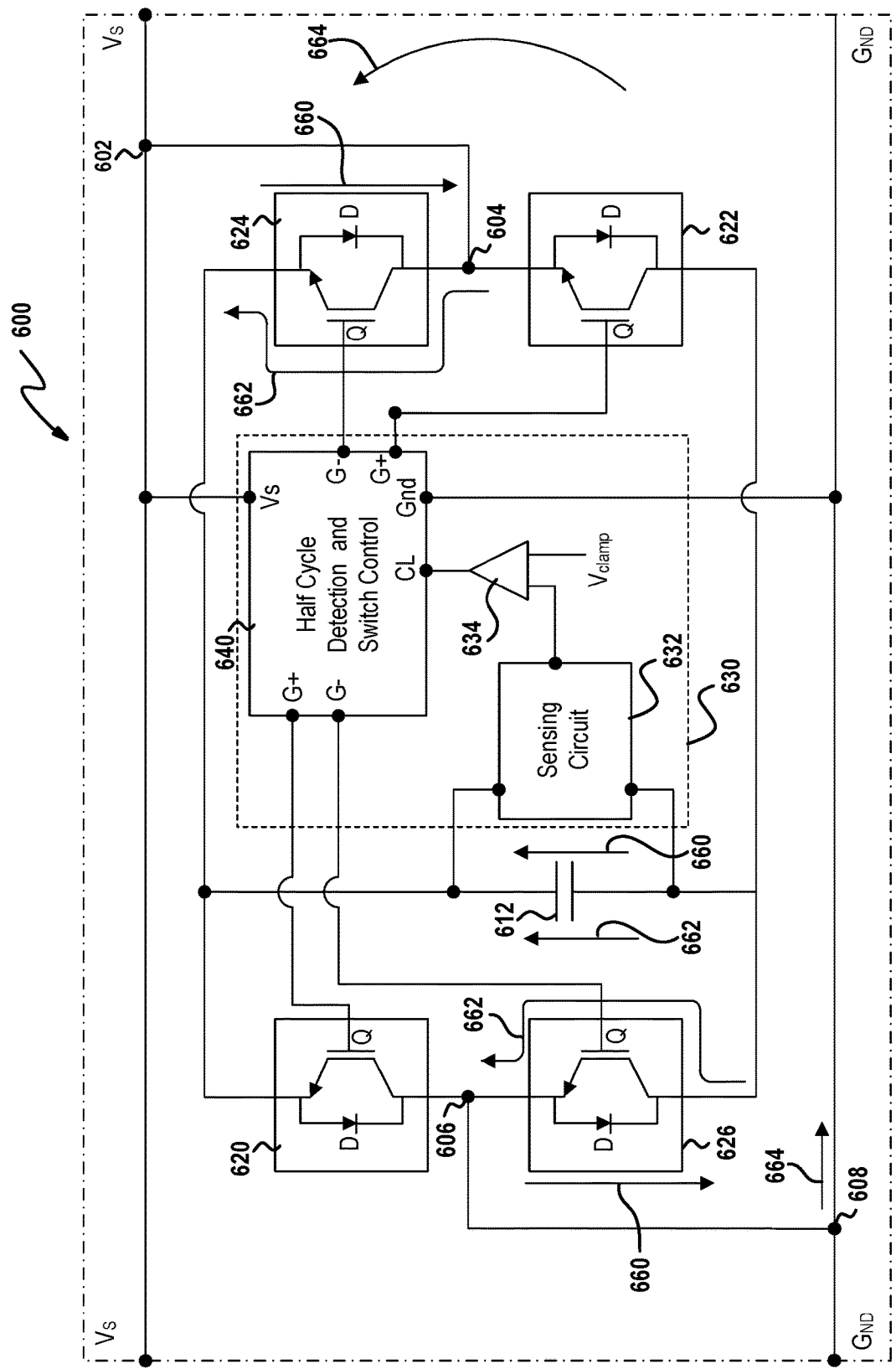
Figure 19:
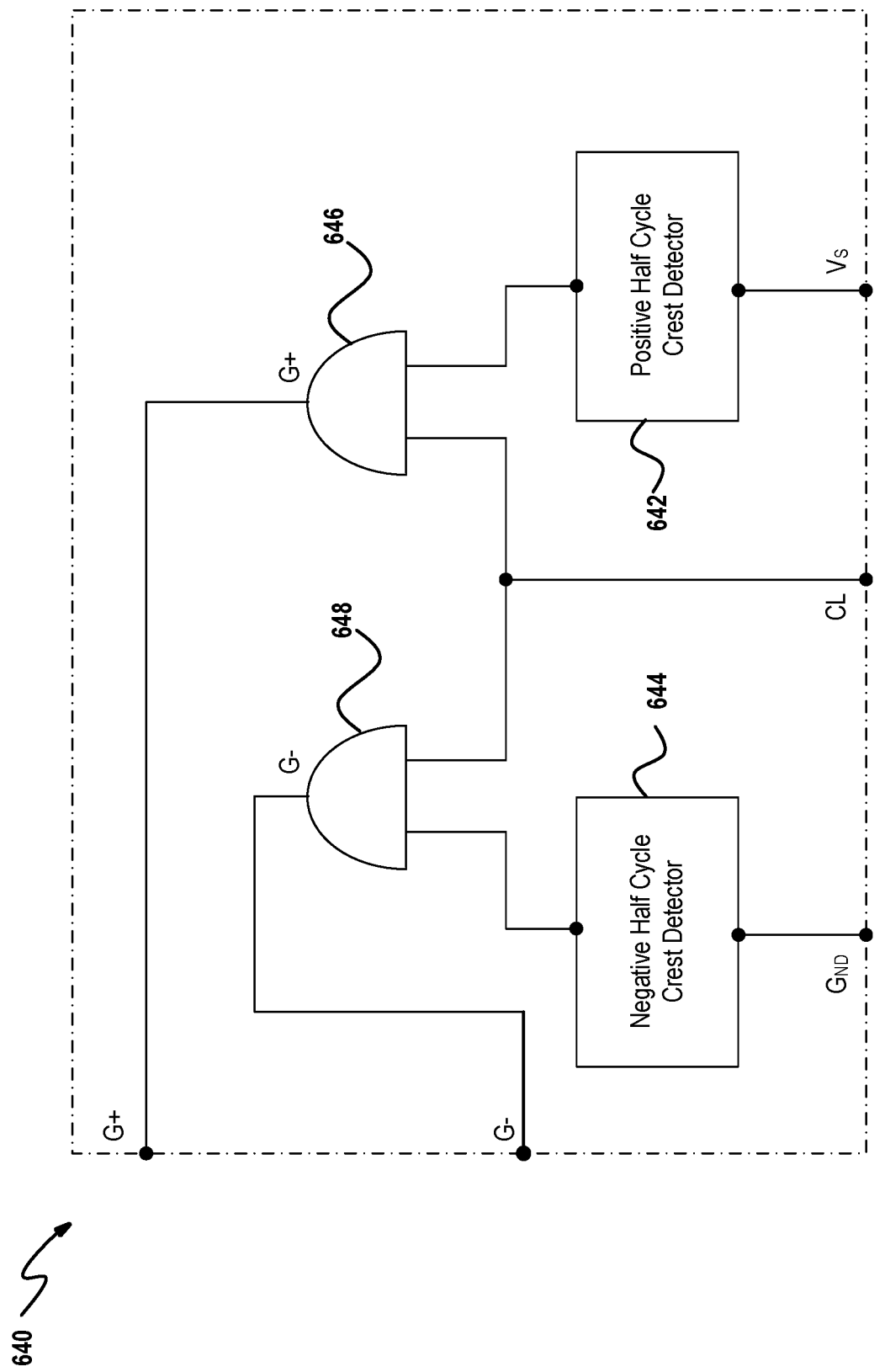

FIGS. 3A, 3B, and 3C are graphs illustrating voltage and current waveforms for different DC bus capacitors;

FIG. 4 is an example motor control system of the present disclosure that has an auxiliary switch path;

FIG. 5 is a graph of voltage and current waveforms of a power supply providing power to the power tool;

FIG. 6 is a graph comparing voltage waveforms of the motor control systems of FIG. 4 (solid line) and FIG. 2 (dotted line);

FIG. 7 illustrates an example of the auxiliary switch path and a switch control circuit;

FIG. 8 illustrate an example circuit of the auxiliary switch path and the switch control circuit;

FIG. 9 is a perspective view of a power tool having a power supply interface;

FIG. 10 is a perspective view of an AC power adapter;

FIG. 11 is a block diagram of a motor control system of the power tool and the AC power adapter, where the AC power adapter includes an auxiliary capacitor circuit having an auxiliary switch path and an switch control circuit in a second embodiment of the present disclosure;

FIG. 12 depicts an exemplary power system including a power tool and an adaptor disposed between the power tool and an AC power supply;

FIG. 13 depicts a circuit block diagram of the power system, according to an embodiment;

FIG. 14 depicts an exemplary circuit diagram of an auxiliary capacitor circuit disposed within the adaptor, according to an embodiment;

FIG. 15 depicts the circuit diagram of FIG. 14 including charge and discharge current paths for the auxiliary capacitor, according to an embodiment;

FIG. 16 depicts an exemplary circuit diagram of an alternative auxiliary capacitor circuit disposed within the adaptor, according to an embodiment;

FIG. 17 depicts the circuit diagram of FIG. 16 including charge and discharge current paths for the auxiliary capacitor within a positive AC half cycle, according to an embodiment;

FIG. 18 depicts the circuit diagram of FIG. 16 including charge and discharge current paths for the auxiliary capacitor within a negative AC half cycle, according to an embodiment; and FIG. 19 depicts an exemplary block circuit diagram of half-cycle detection and switch control unit, according to an embodiment.

Corresponding reference numerals indicate corresponding parts throughout the several views of the drawings.

DETAILED DESCRIPTION

Example embodiments will now be described more fully with reference to the accompanying drawings.

Figure 1:
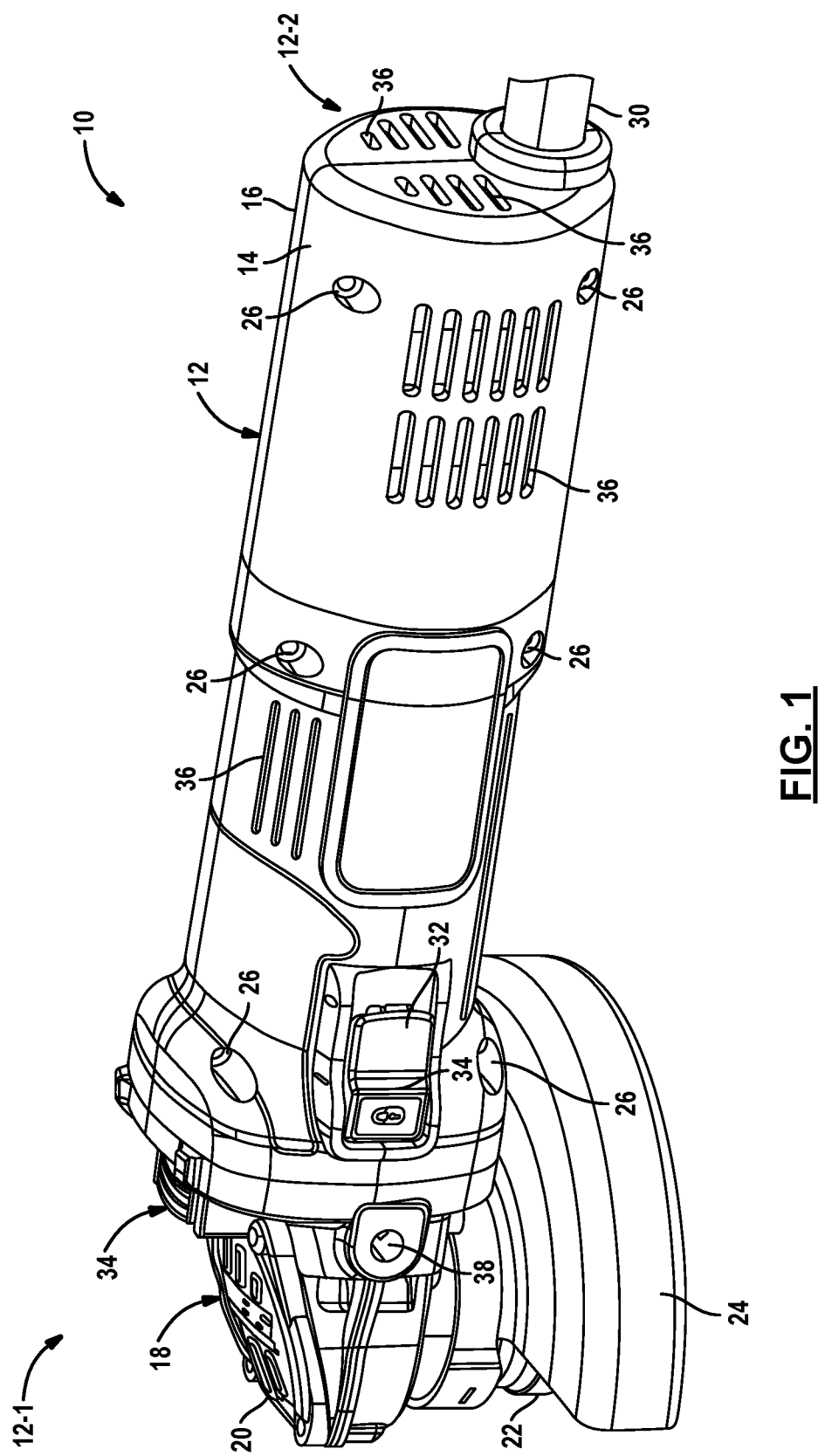
FIG. 1 is a perspective view of a power tool, such as a grinder.

FIG. 1 depicts an example power tool 10. In this example embodiment, the power tool 10 comprises a housing 12 having an elongated shape. A user can grasp the power tool 10 by placing the palm of the user's hand over and around the housing 12. An output member 18 is positioned at one end 12-1 of the housing 12 and comprises a right angle gearset 20 that drives a rotating disk 22. In this example embodiment, the rotating disk 22 comprises a grinder disk.

The rotating disk 22 may be removed and replaced with a new rotating disk. For example, a user of the power tool 10 may replace the existing rotating disk 22 with a new rotating disk after the existing rotating disk 22 wears out. An adjustable guard 24 may cover at least a portion of the rotating disk 22 to obstruct sparks and debris generated during operation of the power tool 10.

The housing 12 has a first portion 14 and a second portion 16. The first portion 14 and the second portion 16 may be secured together with screws 26, and enclose an electric motor 28 and electronic circuit components that drive the output member 18. While the present description is provided with reference to a brushless electric motor, the electric motor 28 may be any type of electrical motor capable of driving the output member 18. A power cord 30 is connectable to an AC power supply and is positioned at an opposite end 12-2 of the housing 12. The power cord 30 provides power to the electric motor 28 and the electronic circuit components of the power tool 10.

The first portion 14 further includes a power on/off switch 32 and a spindle lock switch 34. Operating the power on/off switch 32 in ON and OFF positions turns the electric motor 28 ON or OFF, respectively. Pressing and holding the spindle lock switch 34 enables the user to change the rotating disk 22. A plurality of narrow slot openings 36 of the first 14 and second 16 portions allow for venting of the electric motor 28 and the electronic circuit components. The one end 12-1 of the housing 12 also includes a threaded opening 38 for selectively attaching a side-handle (not shown) to enable two-handed operation.

While the present description is provided with reference to a grinder, it is readily understood that the broader aspects of the present disclosure are applicable to other types of power tools, including but not limited to sander, drill, impact driver, tapper, fastener driver, and saw. For example, the power tool 10 may include a chuck that is configured to receive a drill bit or a screw driver bit, thereby allowing the power tool 10 to be used as a power drill or a power screw driver. In another example embodiment, the output member 18 may be removed and replaced with another output member that may be more suitable for a drill, a screw driver, or any other power tool.

FIG. 2 depicts a schematic that illustrates an example of a motor control system 100 that may be employed by the power tool 10. The motor control system 100 is comprised generally of a controller 102, a switching arrangement 104, a driver circuit 106, a rectifier 108, and a DC bus capacitor 110, and a power supply regulator 112. The motor control system 100 may further include position sensors 114, such as Hall Effect sensors that are configured to detect rotational motion of the electric motor 28 and generate a signal indicative of the rotational motion. The signal may have a periodic waveform whose magnitude may vary in accordance with the rotational position of the electric motor 28. It should be noted, that other types of positional sensors may be alternatively utilized and should not be limited to Hall effect sensors.

An AC power supply 116 delivers an alternating current to the rectifier 108 through, for example, the power cord 30.

The rectifier 108 converts the alternating current into a direct current that is outputted to a DC bus 115 (i.e., power line/bus). The output of the rectifier 108 may be a pulsating DC signal and not a pure DC signal.

The DC bus capacitor 110 is electrically connected in parallel with the rectifier 108 on the DC bus line 115. The switching arrangement 104 is coupled to DC bus 115 line and receives rectified voltage from the rectifier 108 and the DC bus capacitor 110. The switching arrangement 104 includes a plurality of motor switches that, when switched on, deliver the DC current to the electric motor 28. The motor switches may be IGBTs or FETs. The switching arrangement 104 may be further defined as a three-phase inverter bridge although other arrangements are contemplated by this disclosure.

The driver circuit 106 interfaces with the motor switches of switching arrangement 104. The driver circuit 106 controls the state of the motor switches. In the example embodiment, the driver circuit 106 is shown as being separate from the switching arrangement 104. Alternatively, the driver circuit 106 and the switching arrangement 104 may be a single integrated circuit which may be commercially available from various manufactures. For example, the switching arrangement 104, which may include IGBTs, and the driver circuit 106 may be a part of an integrated power module.

The controller 102 interfaces with the driver circuit 106 and may generate PWM signals to control the electric motor 28. In this embodiment, the controller 102 receives power from the power supply regulator 112. In an alternate embodiment, the controller 102 may receive power directly from the rectifier 108.

The power supply regulator 112 is electrically connected in parallel with the rectifier 108 and operates to power the driver circuit 106 via the power on/off switch 32. The power on/off switch 32 is positioned between the power supply regulator 112 and the driver circuit 106.

When the power on/off switch 32 is switched to the ON-position, the driver circuit 106 receives power from the power supply regulator 112. When the driver circuit 106 receives power, the driver circuit 106 is able to control the state of the motor switches and the electric motor 28 is on.

Conversely, when the power on/off switch 32 is switched to the OFF-position, the driver circuit 106 does not receive power from the power supply regulator 112. When the driver circuit 106 does not receive power, the driver circuit 106 is not able to control the state of the motor switches and the electric motor 28 is off.

In the illustrated example, the power on/off switch 32 is electrically connected between the power supply regulator 112 and the driver circuit 106. Thus, the power on/off switch 32 is positioned such that the power from the AC power supply 116 does not pass through the power on/off switch 32. Furthermore, the current being drawn by the electric motor 28 does not pass through the power on/off switch 32. The current passing through the power on/off switch 32 is the current being drawn by the driver circuit 106 and the current being drawn by the driver circuit 106 is lower than the current being drawn by the electric motor 28. It must be understood, however, that in an alternative embodiment, the on/off switch 32 may be a current-carrying switch disposed, for example, on the DC bus line 115 between the rectifier 108 and the switching arrangement 104.

In an embodiment, the DC bus capacitor 110 may be a link capacitor having a relatively small capacitance and does not significantly smoothen the full-wave rectified AC voltage. The DC bus capacitor 110 may be a bypass capacitor that removes the high frequency noise from the bus voltage.

FIGS. 3A-3B highlights the advantages of using a small DC bus capacitor 110 in the power tool 10. FIG. 3A, in an embodiment, depicts the voltage waveform using a relatively large DC bus capacitor 110 (e.g., approximately 400 to 1000 µF) and the associated current waveform. FIG. 3B depicts the voltage waveform using a relatively mid-sized DC bus capacitor 110 (e.g., approximately 50 to 200 µF) and the associated current waveform. FIG. 3C depicts the voltage waveform using a very small DC bus capacitor 110 (e.g., approximately 10 to 30 µF) and the associated current waveform. It is noted that these DC bus capacitor values depend on many factors, most notably the power tool power output requirement. It is noted that exemplary capacitor values provided herein are implemented and tested in conjunction with a circuit as shown in FIG. 2 with max power out of 1.5 to 2 kW.

As shown in FIG. 3A, when using a large DC bus capacitor 110, the current is drawn from the DC bus capacitor 110 for a large portion of each cycle during the capacitor discharge. Thus, current drawn from the AC power supply during each cycle occurs within a small window, which creates a significant current spike. To obtain a constant RMS current of, for example, 10 A from the AC power supply, the current level within the small window increases substantially, which creates the current spikes.

The current spikes in this arrangement are undesirable for two reasons. First, the power factor of the tool becomes low, and the harmonic content of the AC current becomes high. Secondly, for a given amount of energy transferred from the AC source to the tool, the RMS value of the current will be high. The practical result of this arrangement is that an unnecessarily large AC circuit breaker is required to handle the current spikes for a given amount of work.

By comparison, as shown in FIG. 3B, when using a mid-sized, the current is drawn from AC power supply within each cycle occurs within a broader time window, which provides a lower harmonic content and higher power factor. Similarly, as shown in FIG. 3C, when using an even smaller capacitor, the current drawn from the capacitor is very small (almost negligible) within each cycle. Thus, the current drawn from the AC power supply is even broader within each cycle. This provides an even lower harmonic context and a much higher power factor in comparison to FIG. 3A.

Additionally, although small DC bus capacitors provide a lower average voltage to the motor control system, it is indeed possible to obtain a higher power output from the AC power supply. In particular, the smaller capacitors enable more power to be drawn from the AC power supply with a lower harmonic context and higher power factor.

For more details on the benefits and advantages of using a small DC bus capacitor in a AC powered or hybrid AC/DC powered power tool system, reference is made to U.S. patent application Ser. No. 14/715,258 filed May 18, 2015, which is incorporated herein by reference in its entirety.

While using a relatively small DC bus capacitor 110 in the system of FIG. 2 provides many advantages, it may sometimes be desirable to use a larger value capacitor in certain applications. For example, it may be desirable to use a larger DC bus capacitor value in certain applications or conditions, e.g., based on changes in load, changes in speed, changes in power supply voltage, etc. In a specific example, it was found by the inventors of this application that certain power sources, such as certain gas or diesel AC generators, produce transients in the voltage waveform, particularly while operating at high load, when coupled to an AC corded power tool having a brushless motor. The transients in the voltage may cause system and component failure. It was further found by the inventors, as described in detail below, that using a larger DC bus capacitor reduces the voltage transients on the DC bus line, thus reducing risk of damage to the power tool components.

Thus, according to an embodiment of the present disclosure, a switchable auxiliary smoothing capacitor is provided in parallel to the DC bus capacitor. The auxiliary capacitor may be selectively activated via a switch provided in series with the auxiliary capacitor. In an embodiment, the auxiliary capacitor may be selectively activated via the switch when the voltage transients from the power source (such as a power generator) cause the voltage on the DC bus line to exceed a predetermined threshold.

FIG. 4 depicts a motor control system 140 having an auxiliary switch path 150. The auxiliary switch path 150 is electrically coupled in parallel with the rectifier 108 and the DC bus capacitor 110, and is electrically connected between the rectifier 108 and the switching arrangement 104. The auxiliary switch path 150 includes an auxiliary capacitor 152 and a switch 154 positioned in series with the auxiliary capacitor 152.

The switch 154 may be a controlled switch, such as a MOSFET or an IGBT, in an embodiment. The switch 154 may be controlled by software programmed into the controller 102 or another programmable microcontroller. Alternatively, the switch 154 may be controlled by hardware, such a switch control circuit 156, described in detail below. When the switch 154 is closed, the auxiliary capacitor 152 is connected in parallel to the DC bus capacitor 110. An exemplary application and implementation of the switchable auxiliary smoothing capacitor is described herein.

FIG. 5 depicts a graph of the voltage waveform obtained from a power generator during use by an AC corded power tool having a brushless motor. As shown herein, at no load the AC voltage exhibits harmonics having a normal nominal peak voltage. However, during use with some load, current transients cause large spikes in voltage that are almost twice the normal nominal peak voltage at no-load. These voltage spikes damage the electronic components of the power tool and produce significant audible noise.

As depicted in the waveform diagram of FIG. busing of a relatively large capacitor (i.e., in the 100 to 1000 µF range) reduces the voltage transients on the bus and produces better voltage harmonics. The reason for this is that in brushless DC motors, such as motor 28, pulse-width modulation (PWM) control of the switching arrangement 104 regulates the amount of current provided to the motor 28. The PWM control of the motor, however, has an adverse effect on the bus voltage if the power supply is reactive. In particular, transients in the bus voltage V is a function of change in current over time and inductance of the power supply, $$\frac{\Delta V}{\Delta t} = \frac{I}{C},$$

In non-reactive power generators, such as AC mains, the inductance is very small compared to AC generators, and therefore the bus voltage follows the nominal voltage harmonics of the power supply regardless of the current. By contrast, in sources such as power generators and alternators, which are reactive electrical systems, there is inherent inductance L that affects the voltage bus transients in response to sudden changes in load current.

For the motor control system 140 of the present disclosure, the auxiliary capacitor 152 provides a path for unused load current, eventually damping down the rise in bus voltage. The rise in voltage across the capacitor is defined by, $$V = L\frac{\Delta I}{\Delta t}.$$

where I is the amount of current being absorbed by the capacitor. As current decays over the time, by selecting an appropriate value for capacitor, maximum bus voltage can be reduced down to a desired level. In an embodiment, the auxiliary capacitor 152 reduces the voltage transients caused by load current fluctuations by 50%.

In an exemplary embodiment, the capacitance of the auxiliary capacitor 152 is greater than that of the DC bus capacitor 110. In particular, the auxiliary capacitor 152 may have a capacitance that is 5 to 40 times larger than that of the DC bus capacitor 110 depending on the power supply voltage. For example, if the DC bus capacitor 110 is in the range of 10 to 20 µF, the auxiliary capacitor 152 may be, for example, 50 to 200 µF for power tools having rated voltage of approximately 120V and 400-800 µF for power tools having rated voltage of approximately 230V. It should be readily understood that the capacitance of the auxiliary capacitor 152 and the DC bus capacitor 110 are not limited to the values described herein and may be set to other suitable values.

FIG. 7 depicts an example embodiment of the auxiliary switch path 150 and the switch control circuit 156. The switch control circuit 156 selectively activates or deactivates the auxiliary capacitor 152. The switch 154 is provided as a transistor 200, such as an insulated-gate bipolar transistor (IGBT) that has an anti-parallel diode 202. The diode 202 is configured to form a charge path (i.e., a first path) indicated by arrow 204 and the IGBT 200 is configured to form a discharge path (i.e., second path) indicated by arrow 206. The switch 154 controls the follow of current through the auxiliary capacitor 152 via the charge path and/or the discharge path. It is readily understood that other switching mechanisms may be utilized and that the switch 154 should not be limited to the components described herein.

The switch control circuit 156 includes a sensing circuit 208 and a comparator 210. The sensing circuit 208 senses voltage along the DC bus 115. For example, in the example embodiment, the sensing circuit 208 detects the voltage across the capacitor 152. Alternatively, the sensing circuit 208 may alternatively be arranged to sense the voltage difference between the positive and negative nodes of the DC bus 115 (denoted as +DC and −DC herein).

The sensing circuit 208 provides the sensed voltage to the comparator 210, which compares the voltage to a predetermined voltage threshold $V_{clamp}$. If the sensed voltage exceeds the voltage threshold $V_{clamp}$, the comparator 210 output turns ON the transistor 200, which couples the auxiliary capacitor 152 to the DC bus 115 and discharges the auxiliary capacitor 152. More particularly, the IGBT 200 allows current to flow through the discharge path 206 such that the auxiliary capacitor 152 discharges built up charge to reduce the bus voltage transients. In addition to current flowing through the discharge path, current may also flow through the charge path.

When the sensed voltage is lower than the voltage threshold, the IGBT 200 is turned OFF and current flows through the diode 202 via the charge path 204. Specifically, in this embodiment, the auxiliary capacitor 152 is charged by current through the anti-parallel diode 202 during every peak of every half cycle of the bus voltage when the bus voltage exceeds the voltage of the auxiliary capacitor 152. This keeps the auxiliary capacitor 152 in fully charged state. Current to the auxiliary capacitor 152 during normal operation is very nominal and may be determined by the sum of capacitor's internal discharge and the current through the sensing circuit 208. The current is small enough that it does not influence Power-Factor or harmonics of the system.

The voltage threshold for opening and closing the switch 154 (e.g., turning transistor 200 OFF and ON) may be provided as two separate thresholds. For example, a first voltage threshold may be designated for having the switch 154 open when the detected voltage is less than the first voltage threshold and a second voltage threshold may be designated for closing the switch 154 when the detected voltage is greater than or equal to the second voltage threshold. The second voltage threshold is greater than the first voltage threshold.

FIG. 8 depicts an exemplary circuit diagram for the switch control circuit 156. In this embodiment, the comparator 210 is formed around pnp transistor Q306. A zener diode D306 forms a reference voltage along with resistor R332. The reference voltage is applied to the emitter of transistor Q306. The emitter voltage is maintained at zener voltage (−5.1V) with respect to bus voltage. A filter capacitor C315 is provided for the reference voltage.

In an embodiment, the sensing circuit 208 includes resistors R334, R333 and R323 which form a voltage divider. Using this voltage divider, actual capacitor voltage is applied to the base of transistor Q306. In this arrangement, transistor Q306 remains reverse-biased until threshold voltage ($V_{clamp}$) is met across the auxiliary capacitor 152. No collector current flows during this time and resistor R326 keeps the gate to emitter voltage of IGBT 200 at zero. The auxiliary capacitor 152 is constantly charged to the peak AC voltage using the diode 202. As soon as the capacitor 152 charges beyond the threshold voltage $V_{clamp}$ (e.g., second voltage threshold), transistor Q306 forward biases. The threshold voltage $V_{clamp}$ may be, for example, 200 Vdc for a 120V system and 375 Vdc for a 230V system. This causes transistor Q307 to turn on and bypass resistor R334, which in turn lowers the threshold voltage to approximately 180 Vdc (e.g., first voltage threshold), allowing approximately 20 Vdc hysteresis. At this time, diode D306 also forward biases to charge the gate of the IGBT 200. Gate of IGBT 200 (including miller capacitance) is estimated to charge to 18V within 700 μs. Diode D307 acts to ensure gate voltage never exceeds 18V. Once the auxiliary capacitor 152 voltage is lowered below 180V, transistor Q306 reverse biases causing transistor Q308 to turn ON. Transistor Q308, along with resistors R330 and R331, forms a pnp base biased circuit, which acts to discharge the IGBT 200 gate quickly. Resistors R327, R238, and R337 control hysteresis of the switch 154.

In an embodiment, when input voltage is very low, IGBT 200 remains turned OFF, hence the capacitor-diode combination acts like a peak detector with a nominal discharge through its sense resistors. As soon as the voltage transients start to occur and capacitor voltage rises high enough to exceed comparator's high threshold voltage, IGBT 200 turns ON and connects capacitor 152 to the DC bus 115 for discharge. While IGBT 200 is on, capacitor 152 and the bus voltages follow each other very closely. After the bus voltage collapses low enough to hit the lower threshold voltage of the comparator 210 (i.e., transistor Q306), IGBT 200 turns OFF and disconnects the auxiliary capacitor 152 once again.

It is noted that while the switch control circuit 156 disclosed herein is implemented using a voltage sensor and a comparator, the same switch controller may be implemented in software, e.g., a micro-controller coupled to the bus line that read the voltage and compares the voltage to a predetermined voltage level.

It is further noted that while in the exemplary embodiments herein a single auxiliary capacitor 152 is utilized, multiple auxiliary capacitors 152 may be disposed in parallel. In addition, the auxiliary capacitors 152 may be switched on or off individually or in tandem. This arrangement provides system flexibility in the amount of total capacitance that is to be provided to the DC bus 115.

In the example embodiment, the auxiliary switch path is positioned between the rectifier 108 and the switching arrangement 104 within the housing 12 of the power tool 10. Alternatively, the auxiliary switch path and the switch control circuit may be positioned outside of the housing of the power tool and within an adaptor that is configured to connect to the power tool. In one such embodiment, the auxiliary switch path coupled across the DC bus line, as described herein with reference to FIGS. 9-11.

More particularly, with reference to FIG. 9, a power tool 300 (e.g., miter saw) includes a power supply interface 302 that is configured to connect to a power supply such as DC batteries or AC power. Power tool 300 is an example of an AC/DC power tool configured to receive power from an AC power source, or one or more DC battery packs, as described in detail in WO 2015/179318, which is incorporated herein by reference in its entirety. As an example, the power supply interface 302 may be configured to include, one or more DC battery interfaces 304. A pair of DC battery packs (not shown) are configured to connect to the battery interface 304. DC battery packs may be, for example, 60V Max DC battery packs, or convertible battery packs configured to output 60V DC Max battery power. Accordingly, the power tool 300 may be powered by more than one DC battery pack power supply that, when connected in series, together have a high rated voltage that corresponds to the AC rated voltage of the main power supply.

The power supply interface 302 may also include an AC supply interface 306 for receiving AC power. With additional reference to FIG. 10, the power supply interface 302 may be configured to engage with an AC power adapter 308. The AC power adapter 308 includes a housing 310 and a cord 312 including a two or three pronged plug (not shown) at a first end and is coupled to the housing 310 at a second end. The housing 310 includes a pair of DC power tool interfaces 314 that are substantially equivalent in shape and size as the DC battery interface 304 of the power supply interface 302. The housing 310 also includes a receptacle 316 positioned between the pair of DC power tool interfaces 314. In the example embodiment, the receptacle 316 has three prongs that are configured to connect to the AC supply interface 306. Alternatively, the receptacle may be two prong or have other suitable configuration.

The AC power adapter 308 also includes a circuit disposed in the housing 310. FIG. 11 is an example embodiment of the AC power adapter 308 coupled to the power supply interface 302. The power tool 300 includes a motor control system 320 that is substantially similar to the motor control system 100 of FIG. 2. The power supply interface 302 is configured to electrically couple the motor control system 320 to an AC power supply by way of the AC power adapter 308.

The AC power adapter 308 includes an auxiliary capacitor circuit 330 that includes the auxiliary switch path 150 and the switch control circuit 156 (not shown in FIG. 11). For example, the auxiliary capacitor circuit 330 may have the same circuit configuration as the auxiliary switch path 150 and the switch control circuit 156 illustrated in FIG. 7 or 8.

The AC power adapter 308 and the power supply interface 302 both include terminals B+($T_{B+}$), B−($T_{B-}$), and AC ($T_{AC}$). Terminals B+ and B− electrically connect to the DC bus 115 and terminal AC electrically connects the AC power supply to the rectifier 108. By way of internal wiring that runs thru the AC power adapter 308, the power supply interface 302, and the power tool 300, the auxiliary capacitor circuit 330 is electrically coupled to the DC bus 115. Specifically, the auxiliary capacitor circuit 330 is electrically coupled in parallel with the rectifier 108 and electrically connected between the rectifier 108 and the switching arrangement 104.

In the second embodiment, the rectifier 108 and the DC bus capacitor 110 are positioned within the power tool 300 as part of the motor control system 320. Alternatively, the rectifier and the DC bus capacitor may be positioned within the AC power adapter 308. For example, the rectifier may be configured to receive alternating current from the AC power supply via lines ACH and ACL, and output rectified voltage to the power tool 300 by way of lines DC+ and DC−. Accordingly, the AC power adapter and the power supply interface may only include terminals B+ and B−, which electrically couple the rectifier to the DC bus of the power tool. Thus, the terminal AC for supply alternating current to the power tool is no longer required. It should be readily understood to one skill in the art that the rectifier and the DC bus capacitor 110 can be implemented in various suitable ways within the AC power adapter. For example, the rectifier, the DC bus capacitor, and the auxiliary capacitor circuit can be provided on a single circuit or on one or more circuits. Furthermore, the DC bus capacitor may be provided with the power tool whereas the rectifier is provided with the AC power adapter.

The AC power adapter 308 covers the DC battery interfaces 304 of the power supply interface 302 when AC power is being supplied to the power tool 300. In addition, the auxiliary switch path 150 and the switch control circuit 156 are physically positioned external to the power tool 300 within the AC power adapter 308. By placing the auxiliary capacitor 152, the switch 154, and the switch control circuit 156 within the separate AC power adapter 308, the circuit for the power tool 300 may be more compact and is limited to the essential components powering the electric motor 28.

In particular, when DC batteries are used to power the power tool 300, the power tool 300 does not require the auxiliary capacitor 152. The auxiliary capacitor 152 is provided only for AC power. Accordingly, in addition to the performance benefits outlined with respect to the first embodiment, the auxiliary capacitor circuit 330 that includes the auxiliary switch path 150 and the switch control circuit 156 reduce the complexity of the power tool 300 without comprising performance of the power tool.

As discussed above, in an embodiment, the auxiliary switch path and the switch control circuit may be positioned outside of the housing of the power tool and within an adaptor that is configured to connect to the power tool. In the exemplary embodiment of FIGS. 12-17, the auxiliary switch path is coupled via the adaptor across the DC bus line of the power tool. In an alternative embodiment, as described herein, an alternative auxiliary switch path is described that is placed across the AC power line of the adaptor.

FIG. 12 depicts an exemplary power system 400 including power tool 10 previously described with reference to FIGS. 1 and 2, an adaptor 410 disposed between the power tool 10 and an AC power supply, and an AC power plug 412 to be inserted into a corresponding plug receptacle of the AC power supply.

FIG. 13 depicts a circuit block diagram of the power system 400, according to an embodiment. In this figure, as previously described with reference to FIG. 2, power tool 10 includes a motor 28, position sensor 114, and a motor control circuit 100. Adaptor 410 is disposed between the AC power supply 116 and the power tool 10, supplying electric power to the rectifier 108. Adaptor 410 includes an auxiliary capacitor circuit, as described herein, disposed on the AC power line. In an embodiment, the auxiliary capacitor circuit may be configured to activate when, for example, voltage transients on the AC power line exceed a predetermined voltage threshold. This arrangement places the auxiliary capacitor circuit outside the power tool. Thus, the power tool need not be modified to include the auxiliary capacitor and the associated circuitry. Also, this arrangement allows the auxiliary capacitor circuit to place an auxiliary capacitor across the AC power line directly. Thus, the power tool need not provide the adaptor 410 access to the DC bus.

FIG. 14 depicts an exemplary circuit diagram of an auxiliary capacitor circuit 500 disposed within the adaptor 410 on the AC power line identified herein by Vs and Gnd, according to an embodiment of the invention. In this embodiment, since the auxiliary capacitor circuit 500 is disposed on the AC power line, it is provided with a first auxiliary switch path 510 and a first switch control circuit 530 associated with the positive half cycles of the AC power line, and a second auxiliary switch path 520 and a second switch control circuit 540 associated with the negative half cycles of the AC power line.

In an embodiment, the first auxiliary switch path 510 includes a first auxiliary capacitor 512 provided in series with a first switch 514 (including a transistor 516 and an anti-parallel diode 518) across the AC power line (i.e., between the Vs and Gnd nodes). Similarly, the second auxiliary switch path 520 includes a second auxiliary capacitor 522 provided in series with a second switch 524 (including a transistor 526 and an anti-parallel diode 528) across the AC power line. A first switch control circuit 530, which similarly to switch circuit 156 of FIGS. 7 and 8 includes a first sensing circuit 532 and a comparator 534, is provided to selectively activate or deactivate the first auxiliary capacitor 512 via the first switch 514. Similarly, a second switch control circuit 540, including a second sensing circuit 542 and a second comparator 544, is provided to selectively activate or deactivate the second auxiliary capacitor 522 via the second switch 524.

In an embodiment, as shown in FIG. 15, during the positive half cycles of the AC power line, where current flows through the load (i.e., power tool motor) in a current path indicated by arrow 554, the diode 518 of the first switch 514 forms a charge path, indicated by arrow 550 across the first auxiliary capacitor 512. When the first switch control circuit 530 detects an over-voltage condition on the AC power line (e.g., when the voltage across the first auxiliary capacitor 512 exceeds a voltage threshold $V_{CLAMP+}$), it activates the transistor 516 of the first switch 514, which it turns provides a discharge path, indicated by arrow 552 for the first auxiliary capacitor 512.

Similarly, during the negative half cycles of the AC power line, where current flows through the load in a current path indicated by arrow 564, the diode 528 of the second switch 524 forms a charge path, indicated by arrow 560 across the second auxiliary capacitor 522. When the second switch control circuit 540 detects an over-voltage condition on the AC power line (e.g., when the voltage across the second auxiliary capacitor 522 exceeds a voltage threshold $V_{CLAMP-}$), it activates the transistor 526 of the second switch 524, which it turns provides a discharge path, indicated by arrow 562 for the second auxiliary capacitor 522.

In this manner, the first and second auxiliary capacitors 512 and 514 discharge built-up charge to reduce voltage transients presents on the AC power line.

FIG. 16 depicts an exemplary circuit diagram of an alternative auxiliary capacitor circuit 600 disposed within the adaptor 410 on the AC power line identified herein by Vs and Gnd, according to an embodiment of the invention. In this embodiment, the auxiliary capacitor circuit 600 is provided with one auxiliary capacitor 612 (or multiple capacitors provided in parallel) and a corresponding switch control circuit 630. In an embodiment, switch control circuit 630 includes a sensing circuit 634 disposed across the auxiliary capacitor 612 (i.e., on the AC power line), and a comparator 634, similar to switch control circuit 156 of FIGS. 7 and 8 previously described. The comparator 634 compares the voltage across the auxiliary capacitor 612 (i.e., on the AC power line) to a clamp voltage threshold and accordingly outputs a CL signal, described below, to activate an auxiliary switch path allowing the auxiliary capacitor 612 to discharge.

In order to account for the positive and negative half-cycles of the AC power line, in an embodiment, the auxiliary capacitor circuit 600 includes four switches 620, 622, 624, and 626 configured in an H-bridge circuit arrangement. Each of the switches 620, 622, 624, and 626 includes a transistor Q and an anti-parallel diode D, similar to switch 150 of FIG. 7 previously described. In an embodiment, switch control circuit 630 is configured to control the switching operation of the switches 620, 622, 624, and 626 to provide an auxiliary switch path through switches 620 and 622, or switches 624 and 626.

In order to control the switching operation of the switches in the appropriate half cycle, in an embodiment, switch control circuit 630 additionally includes a half-cycle detection and switch control unit 640 coupled to the AC power line to detect when the AC power line is in its positive or negative half cycle. The half-cycle detection unit 640 also receives the CL signal from the comparator 634, and outputs drive signals G+ and G− to drive the gates of the transistors within the switches 620, 622, 624, and 626. Based on the CL signal from the comparator 634, and depending on whether the AC power line is in a positive or a negative half cycle, the half cycle detection and switch control unit 640 turns two of the four switches 620, 622, 624, and 626 ON in tandem. Specifically, when CL signal indicates an over-voltage condition and the AC power line is in a positive half cycle, the half-cycle detection and switch control unit 640 activates the G+ signal to turn ON the transistors Q within the switches 620 and 622. Similarly, when CL signal indicates an over-voltage condition and the AC power line is in a negative half cycle, the half-cycle detection and switch control unit 640 activates the G− signal to turn ON the transistors within the switches 624 and 626.

In an embodiment, as shown in FIG. 17, during the positive half cycles of the AC power line, where current flows through the motor in a current path indicated by arrow 654, the diodes of the 620 and 622 forms a charge path, indicated by arrow 650 across the auxiliary capacitor 612. This charge path 650 flows from Vs, through nodes 602 and 604, diode D of switch 622, capacitor 612, diode D of switch 620, and nodes 606 and 608, to Gnd. When the switch control circuit 630 detects an over-voltage condition on the AC power line (e.g., when the voltage across the auxiliary capacitor 612 exceeds a voltage threshold $V_{CLAMP}$), it activates the transistors Q in switches 620 and 622, which it turns provides a discharge path, indicated by arrow 652 for the auxiliary capacitor 512, substantially opposite the charge path 650.

Similarly, in an embodiment, as shown in FIG. 18, during the negative half cycles of the AC power line, where current flows through the motor in a current path indicated by arrow 664, the diodes of the 624 and 626 forms a charge path, indicated by arrow 660 across the auxiliary capacitor 612. This charge path 660 flows from Gnd, through nodes 608 and 606, diode D of switch 626, capacitor 612, diode D of switch 624, and nodes 604 and 602, to Vs. When the switch control circuit 630 detects an over-voltage condition on the AC power line (e.g., when the voltage across the auxiliary capacitor 612 exceeds a voltage threshold $V_{CLAMP}$), it activates the transistors Q in switches 624 and 626, which it turns provides a discharge path, indicated by arrow 662 for the auxiliary capacitor 512, substantially opposite the charge path 660.

FIG. 19 depicts an exemplary block circuit diagram of half-cycle detection and switch control unit 640, according to an embodiment. In an embodiment, half-cycle detection and switch control unit 640 includes a positive half-cycle crest detector unit 644 and a negative half-cycle crest detector unit 644 respectively coupled to Vs and Gnd signals and configured to output an ON signal when positive or negative half cycle is detected. These crest detectors may be designed according to any known half cycle crest detection mechanism, as will be understood by those skilled in the art. Crest detectors remain ON as long as an AC half cycle is detected and until the next zero crossing. The output of positive half-cycle crest detector unit 642 is provided to an AND gate 646 along with the CL signal from the comparator 634. Similarly, the output of negative half-cycle crest detector unit 644 is provided to an AND gate 648 along with the CL signal. The outputs of AND gates 646 and 648 are respectively outputted on G+ and G− nodes.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. A power tool system configured to receive an alternating current from an alternating current (AC) power supply, the power tool system comprising:
an electric motor;
a switching circuit having a plurality of motor switches connected electrically between the AC power supply and the electric motor to regulate supply of power to the electric motor; and
a switchable capacitor circuit comprising a switchable capacitor switchably coupled across the AC power supply and a H-bridge circuit including four switches, wherein an OFF-state of the four switches creates a charging path for the switchable capacitor, an ON-state of a first pair of the four switches creates a discharge path for the switchable capacitor during a positive half cycle of the alternating current, and an ON-state of a second pair of the four switches creates a discharge path for the switchable capacitor during a negative half cycle of the alternating current.

2. The power tool system of claim 1, further comprising a rectifier arranged between the AC power supply and the switching circuit to output a rectified signal on a DC power bus line.

3. The power tool system of claim 2, further comprising a DC bus capacitor electrically coupled in parallel with the rectifier and electrically connected between the rectifier and the switching circuit, wherein a capacitance of the DC bus capacitor is less a capacitance of the switchable capacitor.

4. The power tool system of claim 3, wherein the capacitance of the DC bus capacitor is about 5 µF to 20 µF.

5. The power tool system of claim 1, further comprising a switch control circuit configured to detect a voltage of the alternating current, control the state of the first pair of the four switches in accordance with a magnitude of the voltage within the positive half cycle, and control the state of the second pair of the four switches in accordance with the magnitude of the voltage within the negative half cycle.

6. The power tool system of claim 5, wherein the switch control circuit comprises:
a sensing circuit configured to detect the voltage of the alternating current;
a comparator configured to compare the detected voltage with a predetermined voltage threshold and output a control signal; and
a half-cycle detection and switch control circuit configured to detect a half cycle polarity of the alternating current and output four signals to the four switches to control the state of the first pair of the four switches and the state of the second pair of the four switches based on the control signal and the detected half cycle polarity.

7. The power tool system of claim 1, wherein the electric motor is a brushless motor.

8. The power tool system of claim 1, wherein the first discharge path is opposite the second discharge path.

9. The power tool system of claim 1, comprising:
a power tool including a first housing that houses the electric motor, the switching circuit, a controller controlling a switching operation of the switching circuit; and
an adapter including a second housing that houses the first switch path and the second switch path.

10. The power tool system of claim 1, wherein each of the four switches comprises an anti-parallel diode forming a charging path for the switchable capacitor.

11. The power tool system of claim 1, wherein the H-bridge circuit includes two nodes coupled across the alternating current and two nodes coupled across the switchable capacitor.

12. A power adapter configured to supply electric power from an alternating current from an alternating current (AC) power supply to a powered apparatus, the power adapter comprising:
a housing; and
a switchable capacitor circuit housed within the housing and including a switchable capacitor switchably coupled across the AC power supply and a H-bridge circuit including four switches, wherein an OFF-state of the four switches creates a charging path for the switchable capacitor, an ON-state of a first pair of the four switches creates a discharge path for the switchable capacitor during a positive half cycle of the alternating current, and an ON-state of a second pair of the four switches creates a discharge path for the switchable capacitor during a negative half cycle of the alternating current.

13. The power adapter of claim 12, further comprising a switch control circuit configured to detect a voltage of the alternating current, control the state of the first pair of the four switches in accordance with a magnitude of the voltage within the positive half cycle, and control the state of the second pair of the four switches in accordance with the magnitude of the voltage within the negative half cycle.

14. The power adapter of claim 13, wherein the switch control circuit comprises:
a sensing circuit configured to detect the voltage of the alternating current;
a comparator configured to compare the detected voltage with a predetermined voltage threshold and output a control signal; and
a half-cycle detection and switch control circuit configured to detect a half cycle polarity of the alternating current and output four signals to the four switches to control the state of the first pair of the four switches and the state of the second pair of the four switches based on the control signal and the detected half cycle polarity.

15. The power adapter of claim 12, wherein the first discharge path is opposite the second discharge path.

16. The power adapter of claim 12, wherein each of the four switches comprises an anti-parallel diode forming a charging path for the switchable capacitor.

17. The power adapter of claim 12, wherein the H-bridge circuit includes two nodes coupled across the alternating current and two nodes coupled across the switchable capacitor.

* * * * *